US007027453B2

(12) United States Patent
Lui et al.

(10) Patent No.: US 7,027,453 B2
(45) Date of Patent: *Apr. 11, 2006

(54) SPANNING TREE ALTERNATE ROUTING BRIDGE PROTOCOL

(75) Inventors: King-Shan Lui, Urbana, IL (US); Whay Chiou Lee, Cambridge, MA (US)

(73) Assignee: General Instrument Corporation, Horsham, PA (US)

( * ) Notice: Subject to any disclaimer, the term of this patent is extended or adjusted under 35 U.S.C. 154(b) by 1029 days.

This patent is subject to a terminal disclaimer.

(21) Appl. No.: 09/977,115

(22) Filed: Oct. 13, 2001

(65) Prior Publication Data

US 2002/0101875 A1 Aug. 1, 2002

Related U.S. Application Data

(60) Provisional application No. 60/239,842, filed on Oct. 13, 2000.

(51) Int. Cl.
*H04L 12/28* (2006.01)
(52) U.S. Cl. ...................... 370/408; 709/252
(58) Field of Classification Search ...................... None
See application file for complete search history.

(56) References Cited

U.S. PATENT DOCUMENTS

| | | | |
|---|---|---|---|
| 4,811,337 A | | 3/1989 | Hart |
| 5,150,360 A | | 9/1992 | Perlman et al. |
| 5,734,824 A | * | 3/1998 | Choi ........................... 709/224 |
| 6,032,194 A | * | 2/2000 | Gai et al. .................... 709/239 |
| 6,188,694 B1 | * | 2/2001 | Fine et al. ................... 370/402 |
| 6,202,114 B1 | * | 3/2001 | Dutt et al. ................... 710/311 |
| 6,262,977 B1 | * | 7/2001 | Seaman et al. ............. 370/256 |
| 6,717,950 B1 | * | 4/2004 | Lui et al. .................... 370/408 |

OTHER PUBLICATIONS

T. Rodeheffer, et al. "SmartBridge: A Scalable Bridge Architecture," a 2000 publication from the ACM Special Interest Group on Computer Communication.
R. Garcia, et al. "A New Transparent Bridge Protocol for LAN Internetworking Using Topologies with Active Loops," a publication from the International Conference on Parallel Processing of 1998.
An IEEE Publication entitled, "IEEE Standard for Information Technology—Telecommunications and information exchange between the systems—Local and metropolitan area networks—Common specifications. Part 3: Media Access Control (MAC) Bridges." Adopted by the ISO/IEC 15802-3:1998.

(Continued)

*Primary Examiner*—Duc Ho
*Assistant Examiner*—Phuongchau Ba Nguyen
(74) *Attorney, Agent, or Firm*—Robert P. Marley

(57) ABSTRACT

Bridges (10, 12, 14) are used to interconnect local area networks transparently. In the IEEE 802.1D standard for bridges, a spanning tree is built among the bridges for loop-free frame forwarding (FIG. 10). Although this approach is simple, it does not support all-pair shortest paths. A novel bridge protocol is employed that attempts to find and forward frames over alternate paths that are shorter than their corresponding tree paths on the standard spanning tree, and makes use of the standard spanning tree for default forwarding. The proposed protocol, referred to as the Spanning Tree Alternate Routing (STAR) Bridge Protocol, is backward compatible with the IEEE 802.1D standard and has a complexity that is comparable to that of the standard and other existing protocols.

26 Claims, 19 Drawing Sheets

OTHER PUBLICATIONS

A 1991 IEEE Publication by Y.-D Lin, et al. entitled, "Brouter: The Transparent Bridge with Shortest Path in Interconnect LANs".

A 1991 IEEE Publication by B. Rajagopalan, et al. entitled, "Load Sharing and Shortest-Path Routing in Transparently Inter-connected Local Area Networks".

A 1991 IEEE Publication by T.-Y, Tai et al entitled, "LAN Interconnection: A Transparent, Shortest-Path Approach".

A 1990 IEEE Publication by G. Varghese, et al. entitled, "Transparent Interconnection of Incompatible Local Area Networks Using Bridges".

A 1988 IEEE Publication by L. Zhang entitled, "Comparison of Two Bridge Routing Approaches".

A 1988 IEEE Publication by R. Perlman, et al, entitled, "Choosing the Appropriate ISO Layer for LAN Interconnection".

A 1988 IEEE Publication by W.M. Seifert entitled, "Bridges and Routers".

A 1988 IEEE Publication by J. Hart entitled, "Extending the IEEE 802.1 MAC Bridge Standard to Remote Bridges".

A 1988 IEEE Publication by F. Backes entitled, "Transparent Bridges for Interconnection of IEEE 802 LANs".

A 1988 IEEE Publication by Soha et al. entitled, "Comparison of Two LAN Bridge Approaches".

* cited by examiner

ENHANCED FORWARDING PATH
db(s) → ab(s) → ··· → ab(t) → db(t)

ENHANCED FORWARDING PATH:
db(s) → ab(s) → ab(t) → db(t)

ENHANCED FORWARDING PATH
db(s) → ab(s) → w → db(t) → ab(t) → db(t)

SPANNING TREE ALTERNATE ROUTING BRIDGE PROTOCOL

This application claims the benefit of Provisional 60/239,842 filed Oct. 13, 2000.

BACKGROUND OF THE INVENTION

1. Field of the Invention

The present invention relates generally to employing a bridge protocol for interconnecting two or more local area networks (LANs). More particularly the invention relates to apparatus and method, which is backward compatible with existing 802.1D Spanning Tree Bridge Protocol, for improving routing capability of spanning tree forwarding without a significant increase in complexity by providing a shorter alternate forwarding path if possible while using a path on the spanning tree by default.

2. Background Information

A Local Area Network (LAN) is used to connect end stations together within close distance in order to provide high-bandwidth communications. A single LAN has a limited number of end stations, a limited size, and a limited amount of offered load. In this respect, LANs cannot grow beyond a certain limit. LANs may be interconnected via internetworking devices such as bridges and routers. These devices have different advantages and disadvantages depending on the internetworking environment. In the early days of internetworking, bridges were popular because they were much cheaper and faster than routers. In addition, bridges were used to support heterogeneous network layer protocols. The primitive computing technology of those days favored off-loading of work to larger servers using protocols that were optimized for LANs.

IEEE 802 Standards Committee has specified two bridge protocols. IEEE 802.1 group has issued the IEEE 802.1D Spanning Tree Bridge Protocol and IEEE 802.5 group has issued the Source Routing Bridge Protocol. Among these two schemes, IEEE 802.1D offers a better solution and has been studied more intensively. This approach is transparent to end stations and requires no modifications to the MAC layer of end stations. All the routing related operations are done in the bridges. Today, the IEEE 802.1D Spanning Tree Bridge Protocol is widely used for interconnecting the family of IEEE 802 standard LANs. For example, the Data-Over-Cable Service Interface Specifications (DOCSIS) describes the use of the IEEE 802.1D Spanning Tree Bridge Protocol to interconnect Cable Modem Termination Systems (CMTSs) over a switched or bridged headend network. According to DOCSIS, data forwarding through the CMTS may be transparent bridging, or network layer forwarding, but data forwarding through the Cable Modem (CM) is link-layer transparent bridging. The IEEE 802.1D standard is optional for CMs intended for residential use, but CMs intended for commercial use and bridging CMTSs must support the IEEE 802.1D standard.

A bridge has several ports connecting to different LANs. A frame sent from one LAN to the other will typically go through one or more ports and bridges. As bridges are capable of filtering frames, they are useful for dealing with unnecessary broadcast traffic. Such a broadcast containment capability renders bridging a simple solution to implementing a virtual LAN. This bridged LAN environment should be transparent and looks like a single LAN to end users. The basic function of bridges is to forward MAC (Medium Access Control) frames from one LAN to another, therein providing an extension to the LAN without requiring any modification to the communications software in the end stations attached to the LANs. Bridges do not modify the content or format of the MAC frames they receive. The operation of bridges should not misorder or duplicate frames. Upper-layer protocol transparency is a primary advantage of bridging since bridges can rapidly forward traffic representing any network-layer protocol without having to examine upper-layer information.

The landscape for internetworking has evolved considerably with advances in high-speed layer 3 routing and layer 2 switching technologies. Functionalities at the two layers are increasingly similar. While routers are generally more intelligent than bridges in terms of their dynamic routing capability, they are also more complicated and costly to implement. Bridges have been designed to span a range of routing capabilities from dynamic source routing to static spanning tree forwarding, thereby allowing a trade-off between routing performance and protocol complexity. Although routers are becoming cheaper and faster than they used to be, they remain more complicated than bridges to operate because intermediate hops must still rise above layer 2. In spite of the common wisdom that IP has won the network layer, there are still going to be non-IP layer 3 protocols in the foreseeable future. On the other hand, while bridges are evolving to accommodate more and more layer 3 functionality, they will always support multiple layer 3 protocols.

An IP (Internet Protocol) address encodes both a network and a host on that network. Since it does not specify an individual machine, but a connection to a network, the IP address of a host must change whenever it moves from one network to another. On the other hand, an IEEE 802 MAC address identifies a physical interface from a station to a LAN, and is always applicable no matter where the station is plugged into a network. Such portability of end station addresses is important particularly for mobility and the benefit of plug-and-play. Although new features, are emerging to minimize the need to configure and reconfigure IP addresses, these features can increase the cost and processing overhead of the system. DHCP (Dynamic Host Configuration Protocol), for example, provides a widely deployed framework for host registration and configuration. DHCP, however, was designed only for fixed hosts on physically secure LANs. DHCP is being extended to allow dynamic reconfiguration of a single host triggered by the DHCP server (e.g. a new IP address). Depending on the bandwidth of the network between server and client, the delay in the reconfiguration process can grow exponentially as failed retransmissions trigger exponential backoff.

In the IEEE 802.1D standard, a shortest path spanning tree with respect to a predetermined bridge, known as a root bridge, is used to interconnect LANs to form an extended LAN. A frame sent from one LAN to another could follow a longer path on the spanning tree than necessary when there exists an alternative shorter path connecting them. Note that non-tree links, which are links that have not been selected by the 802.1D spanning tree algorithm, are not used to share the load of the traffic. The load around the root bridge may be heavy, and throughput is severely limited.

The IEEE 802.1D specification defines a protocol architecture for MAC bridges and recommends formats for a globally administered set of MAC station addresses across multiple LANs.

FIG. 1 shows a bridge protocol architecture for a connection of two LANs via local 10 or remote 12, 14 bridging. Referring to the OSI (open systems interconnect) reference model, a bridge encompasses the first two layers, namely the Physical Layer (layer 1) and the Data Link Layer (layer 2). There are two sublayers in layer 2: Medium Access Control (MAC) sublayer and Logical Link Control (LLC) sublayer. Bridges operate relay functions on the MAC sublayer and interface with the LLC sublayer above through LLC service access points. By using bridges, a growing LAN can be partitioned into self-contained units for administrative or maintenance reasons, as well as to improve performance via load balancing and fault isolation. Bridges are typically used to interconnect LANs of the same type, such as the family of IEEE 802 LANs. Translation among different link-layer protocols is needed, however, when the interconnected LANs are not homogeneous (e.g., IEEE 802.3 and IEEE 802.5 type LANS), and interoperability is achieved by appropriate frame encapsulation.

A bridge relays individual MAC user data frames between separate MAC protocols of the bridged LAN connected to the ports of the bridge. A MAC entity for each port handles all the media access method dependent functions, i.e., MAC protocol and procedures, as specified in the relevant IEEE 802 standard for that MAC technology. Each bridge port receives and transmits frames to and from the LAN to which it is attached using the services provided by the individual MAC entity associated with that port. Each bridge port also functions as an end station providing MAC service to the LLC layer. All MAC entities communicating across a bridged LAN are uniquely identified by their respective 48-bit MAC addresses. A bridge may use a 48-bit MAC address, or a 16-bit locally administered MAC address. This bridge address must be unique within the extended LAN, and a single unique bridge identifier (ID) is derived from it for the operation of a bridge protocol. Each frame transmitted from a source end station, for example 16, to a destination end station, for example 18, carries the MAC addresses of the end stations respectively in the source and destination address fields of the frame's MAC header. A frame that is to be relayed by every bridge to all its neighboring bridges in an extended LAN contains a bridge group MAC address in the destination address field of the frame's MAC header.

The three basic functions set forth in the present standards of an IEEE 802.1D bridge are:

1) frame forwarding—forward a frame received from one port to another port
2) learning—"learn" and "remember" which port to forward a frame
3) spanning tree algorithm—make sure activated links form no loop, i.e., the bridges and links form a spanning tree Functions (1) and (2) above are performed with the help of a Forwarding Database, or Filtering Database, (see FIG. 7-4 of IEEE 802.ID 1998 Edition), within each bridge. Each bridge keeps a Forwarding Database, hereafter denoted FD, that specifies which port to forward a data frame with a particular destination. If there is no such entry in the FD, the bridge forwards the frame through all ports except the port from which the frame originates. Whenever a frame from source s arrives from port p, the bridge marks in its FD that the forwarding port of s is p. As the learning process is simple, if there are loops in the bridged LAN, a frame may be forwarded indefinitely. To avoid this undesirable feature, function (3) mentioned above is used to make sure the active topology among the bridges is always a tree so that there is a unique path between each pair of bridges. We refer to such a path herein as a tree path.

The spanning tree algorithm builds a unique shortest path tree rooted at the root bridge in a distributed manner. This root bridge is selected using bridge identifiers. A path connecting the root bridge and another bridge over the spanning tree is referred to as a root path associated with the bridge. By exchanging configuration messages, bridges identify the root bridge and select which ports to activate. For each LAN, a single bridge is elected among all bridges connected to the LAN to be the designated bridge, such that it is the bridge that is closest to the root bridge. In order to maintain an up-to-date tree that reflects the underlying topology, the root bridge broadcasts configuration messages periodically over the spanning tree to all other bridges, for example, approximately every four (4) seconds.

The IEEE 802.1D standard defines two types of Bridge Protocol Data Unit (BPDU), namely Configuration BPDU and Topology Change Notification BPDU. Bridges send MAC frames containing Configuration BPDU to each other in order to communicate topology information and compute the spanning tree. Bridges send MAC frames containing Topology Change Notification BPDU up the spanning tree to inform the root bridge of a topology change. Each Configuration BPDU MAC frame includes a MAC header that contains a source MAC address and a destination MAC address. The source MAC address is the MAC address on the port of the bridge originating the Configuration BPDU MAC frame. The destination MAC address field carries the bridge group MAC address so that the Configuration BPDU MAC frame is received by all the bridges in the extended LAN. The information in the Configuration BPDU may be used by a bridge in preparing its own Configuration BPDU MAC frame. Each Configuration BPDU contains a BPDU Header and a set of BPDU Parameters. The BPDU Header consists of a Protocol Identifier field, a Protocol Version Identifier field and a BPDU Type field. The Protocol Identifier takes a specific value that identifies the Spanning Tree Bridge Protocol. The Topology Change Notification BPDU consists merely of a Protocol Identifier field, a Protocol Version Identifier field, and a BPDU Type field with a code reserved for this type. When a bridge detects a change in the active topology of the spanning tree, it sends a Topology Change Notification BPDU to the root bridge. The root bridge will then broadcast it to all bridges in the extended LAN. The encoding for the fields in the Configuration BPDU and the Topology Change Notification BPDU can be found in the IEEE standards.

In order to balance traffic load, extensions to the IEEE 802.1D Spanning Tree Bridge Protocol have been proposed to allow non-tree links to be used for frame forwarding under appropriate conditions. These extensions consider alternate paths that traverse at least one non-tree link.

For example, U.S. Pat. No. 4,811,337 (Hart) discloses a method, known as distributed load sharing (DLS), to allow non-tree links to be selected for frame forwarding. In accordance with the method of Hart, a forwarding path is either a tree path, a DLS link, or a DLS path that is a concatenation of DLS links. This method requires each selected DLS link to satisfy the following conditions:

a) The two DLS bridges at the ends of the selected DLS link must both implement DLS.
b) The two bridges at the ends of the selected DLS link must be such that one of them is not the ancestor of the other in the spanning tree.
c) The length associated with the selected DLS link must be no greater than the sum of the root path distances associated with the two DLS bridges.

Condition (b) above is necessary in order to prevent any intermediate bridge on the tree path between the two DLS bridges to misinterpret a forwarding direction of a particular end station. In view of condition (c), Hart's approach can overestimate the actual length of a tree path between two DLS bridges. In this respect, a non-tree link between a pair of DLS bridges may actually be selected even though it has a greater length than the length of the corresponding tree path. There is no such problem only when the root bridge is on the tree path between the two DLS bridges. Thus, this method cannot guarantee that a forwarding path is no worse than its corresponding tree path for any additive metric considered.

U.S. Pat. No. 5,150,360 (Perlman, et al.), extended Hart's DLS method to address certain shortcoming of the DLS method. Specifically, Perlman, et al., proposed to identify non-tree links so that they can be used for forwarding frames without traveling a long way on the spanning tree. The approach is simpler than DLS and can utilize any non-tree link connecting a pair of bridges that have implemented the extended protocol, referred to as Generalized DLS (GDLS). GDLS does not select a non-tree link between a pair of GDLS bridges to be a GDLS link by comparing the length of the non-tree link to that of the corresponding tree path. Instead, GDLS compares the "speed" of the non-tree link to that of the corresponding tree path. The "speed" of the non-tree link and that of the tree path are determined by having one of the GDLS bridges send to the other GDLS bridge a special protocol data unit over the non-tree link and another over the tree path. Separate information has to be kept for every non-tree link even though some links will not be used at all. The method of Perlman, et al., cannot guarantee that a forwarding path is no worse than its corresponding tree path for any additive metric considered except when the additive metric is delay. Incidentally, this method is backward compatible with the IEEE 802.1D Spanning Tree Bridge Protocol.

Another prior art method dynamically creates a shortest path tree rooted at a given source starting with a default spanning tree. Some non-tree links are activated and some tree links are disabled on demand according to a delay measure. Information kept in bridges grows quadratically with the number of ports in the bridges. This method is not backward compatible with respect to the IEEE 802.1D Spanning Tree Bridge Protocol.

A bridge learning protocol has also been devised so that optimal or suboptimal routes can be identified. Cost to each known end station is kept for each port. The protocol works similarly to the distance vector method and is backward compatible with respect to the IEEE 802.1D Spanning Tree Bridge Protocol. Topology information is kept by every bridge for every port. Moreover, when there are bridges that do not execute the protocol, a path found by the protocol may be longer than its corresponding tree path.

Prior art methods also propose to maintain distance vectors in bridges showing the shortest path direction for getting to a particular LAN, and not to a station. Mapping tables are used to map stations to LANs. When a frame is received, the bridge maps the target station to the target LAN and finds the forwarding port from the distance vector. Mapping tables are exchanged by means of flooding (standard for distributing local information throughout the network). This protocol is not backward compatible with respect to the IEEE 802.1D Spanning Tree Bridge Protocol. There are bridge architectures that have IP routing features. Bridges exchange topology information to obtain the complete topology of the extended LAN. Once the complete topology is synchronized, the shortest path to every LAN can be found. Their architecture also has a mechanism to locate end station to LAN, which is similar to the mapping tables. These protocols are not backward compatible with respect to the IEEE 802.1D Spanning Tree Bridge Protocol.

SUMMARY OF THE INVENTION

The present invention is a novel bridge protocol, which will be referred to hereafter as a Spanning Tree Alternate Routing (STAR) Bridge Protocol, that has important advantages over the present day techniques discussed above. The proposed bridge protocol of the present invention is transparent to end stations, backward compatible with the current IEEE 802.ID standard, free of loops in frame forwarding, and easy to implement with scalable message overhead and storage requirement. In the protocol disclosed herein, forwarding paths are selected based on a path metric that is a sum of link metric values of all the links along the path, wherein the link metric is any desirable cumulative metric, such as delay, administrative cost, number of hops, etc. We will show that our protocol always finds a path that is either shorter or the same as the path on the spanning tree. This protocol is also backward compatible with the IEEE 802.1D standard, such that existing bridges need not be modified and new bridges, henceforth referred to as STAR bridges, operate seamlessly with the existing standard. The STAR Bridge Protocol attempts to find and forward frames over alternate paths that are shorter than their corresponding tree paths on the standard spanning tree, and makes use of the standard spanning tree for default forwarding. We refer to the shorter alternate paths herein as enhanced forwarding paths. The protocol may use any of a variety of distance metrics for evaluating forwarding paths, including number of hops, physical length, transmission delay, and cost, provided the metric used is supported by the standard bridge protocol. In one embodiment of the present invention, all frames sent from a source bridge to a destination bridge are forwarded over either a standard tree path or an enhanced forwarding path, but not both. In another embodiment of the present invention, all frames sent from a source bridge to a destination bridge are forwarded over standard tree paths by default, while frames of a predetermined class are forwarded over enhanced forwarding paths if these alternate paths are available.

In the STAR Bridge Protocol, all three bridge processes specified for the IEEE 802.1D Bridge Protocol and set forth above are still relevant. However, three new processes are further specified, namely path finding process, STAR learning process, and STAR forwarding process. The path finding process allows a STAR bridge to find and estimate the distance of a path from itself to another STAR bridge. The STAR forwarding process and the STAR learning process are modified versions of the forwarding process and the learning process specified in the IEEE 802.1D standard respectively. All STAR bridges can execute both the standard and the new processes, employing hardware already resident in non-STAR bridges.

In the IEEE 802.1D standard, a rooted spanning tree (RST) is built before the forwarding and learning processes start. The STAR Bridge Protocol builds, in a similar manner, an RST before the execution of the path finding process, the STAR forwarding process and the STAR learning process. The RST is found by old and STAR bridges alike. A STAR bridge can identify whether a neighbor bridge is an old bridge or a STAR bridge while the RST is being computed. This can be done by using reserved bits in the bridge messages, or having the neighbor send an extra bridge frame. We refer to a non-tree link that directly connects a pair of bridges that are on different branches of the IEEE 802.1D spanning tree as a crosslink. The STAR Bridge Protocol identifies appropriate crosslinks to be used for constructing enhanced forwarding paths.

The path finding process follows after the spanning tree algorithm is executed. During this interim period until the path finding process ends, STAR bridges and old bridges execute the standard forwarding process and the standard learning process while data frames are forwarded on tree paths. When the path finding process ends, each STAR bridge begins to execute the STAR learning process and the STAR forwarding process instead of the standard ones executed by old bridges when it receives a data frame.

One of the significant features and advantages of the present invention resides in the interoperability, i.e., the backwards compatibility of the STAR bridges with old bridges meeting the present IEEE standards described above. This enables advantageous use of STAR bridges in a system wherein standard bridges may be replaced in a gradual, orderly fashion thereby providing a system with the advantages derived from STAR bridges and thereby avoiding the need for a large capital expense which will result from full replacement of all standard bridges by STAR bridges at one time.

Even a system incorporating all STAR bridges provides the capability of providing enhanced paths not heretofore capable of being obtained in a system employing standard bridges.

BRIEF DESCRIPTION OF THE FIGURES

The present invention will hereinafter be described in conjunction with the appended drawing figures, wherein like numerals denote like elements, and.

DETAILED DESCRIPTION OF THE PREFERRED EMBODIMENTS

I. Spanning Tree Alternate Routing (Star) Bridge Protocol

I.A. Bridge States

The ensuing detailed description provides preferred exemplary embodiments only, and is not intended to limit the scope, applicability, or configuration of the invention. Rather, the ensuing detailed description of the preferred exemplary embodiments will provide those skilled in the art an enabling description for implementing a preferred exemplary embodiment of the invention. It being understood that various changes may be made in the function and arrangement of elements without departing from the spirit and scope of the invention as set forth in the appended claims.

Figure 1:
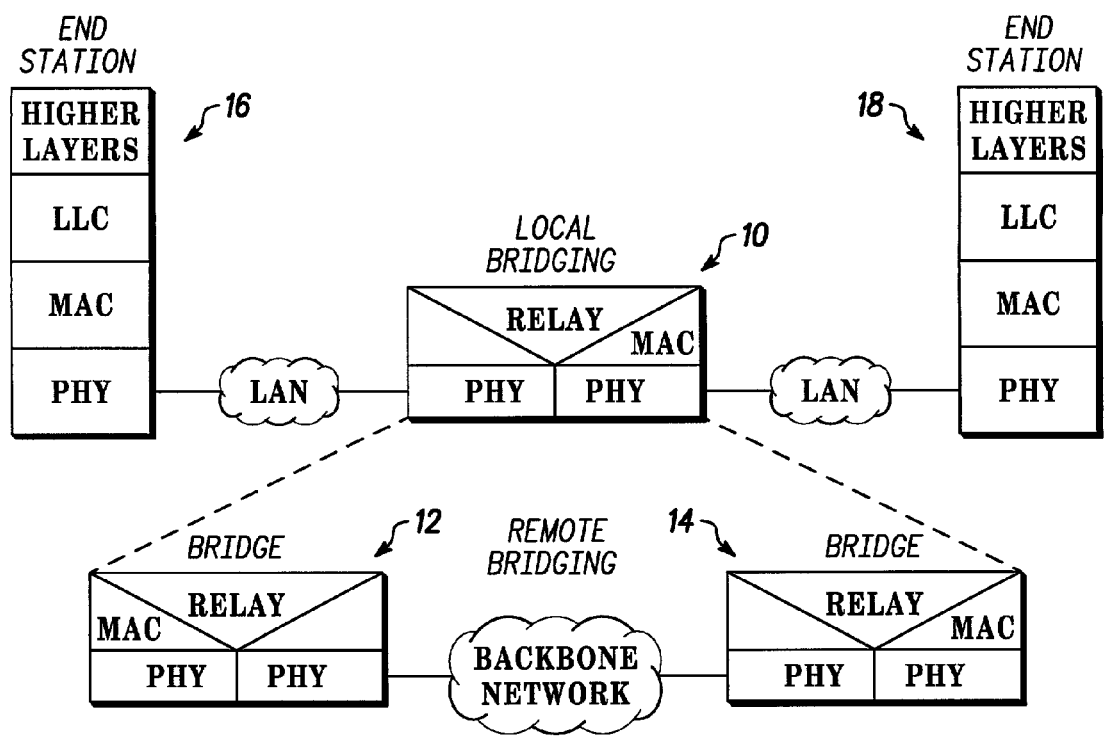
FIG. 1 is a diagram showing bridge protocol architecture for connecting two LANs via remote or local bridging.
Figure 2:
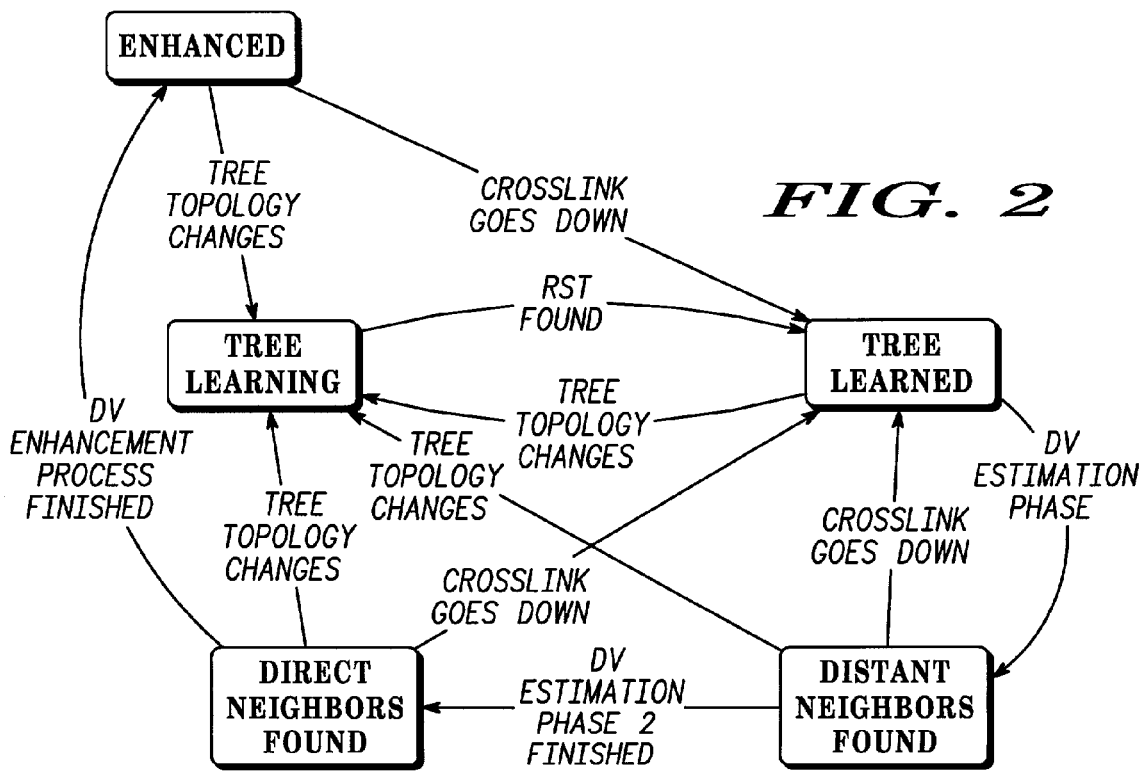
FIG. 2 is a bridge state transition diagram for the STAR Bridge Protocol.

FIG. 2 shows a bridge state transition diagram for the STAR Bridge Protocol. There are five states: Tree Learning, Tree Learned, Distant Neighbors Found, Direct Neighbors Found, and Enhanced states. The first two states capture the behavior of an old bridge in accordance with the IEEE 802.1D standard, while the other three states reflect the additional functionality of a STAR bridge. When the spanning tree is being built, each bridge (both old and STAR bridges) is in the Tree Learning state. In this state, all data frames are dropped as in the IEEE 802.1D standard. After the spanning tree is built, the bridge goes to the Tree Learned state. A path finding process starts and data frames are forwarded using the standard forwarding and learning processes. There are several phases in the path finding process. The bridge first goes to the Distant Neighbors Found state, then the Direct Neighbors Found state, and finally the Enhanced state in different phases. The transitions will be explained further hereinafter in the Path Finding Process section. When the bridge is in the Enhanced state, the path finding process is completed. STAR forwarding and learning processes are executed when a data frame is received in this state.

I.B. Port States

Figure 3:
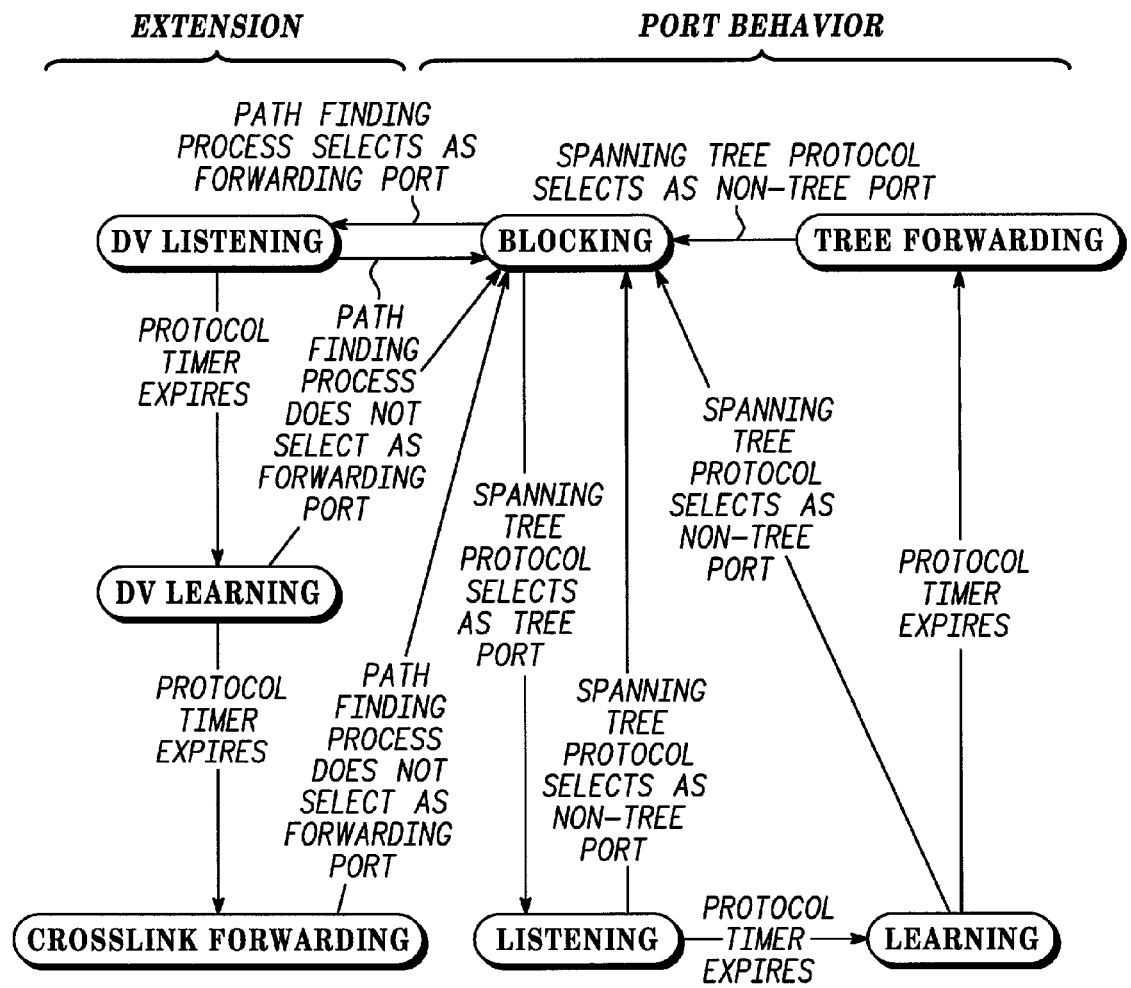
FIG. 3 is a port state transition diagram showing both the standard states and the additional states according to the STAR Bridge Protocol.

In the IEEE 802.1D standard, there are four port states: Blocking, Listening, Learning, and Forwarding. In the STAR Bridge Protocol, there are three additional port states for the path finding process, which are similar to the Listening, Learning, and Forwarding states. These port states, and the transactions among the port states are shown in FIG. 3. These new port states are distance vector listening (DV Listening), distance vector learning (DV Learning), and STAR Forwarding. The IEEE 802.1D Spanning Tree Bridge Protocol activates tree ports while the path finding process activates other useful non-tree ports. The transition among the four states in the standard remains the same for the STAR bridges. A port changes from the Blocking state to the Listening state when it is selected as a tree port. After an appropriate protocol timer expires, the port moves to the Learning state. In this state, learning is enabled but data frames will not be forwarded. The port is in the Forwarding state if the timer expires again. A port changes from the Blocking state to the DV Listening state if the path finding process selects it. A protocol timer is started when the port enters the DV Listening state. When this timer expires, the port moves to the DV Learning state. Unlike the Learning state in the present IEEE standard, in which a port learns the locations of end stations, a port in DV Learning state does not do this. It is because all data frames are still forwarded on tree paths and a port in DV Learning state must be a non-tree port. Hence, there should be no data frame arriving on that port. A similar protocol timer is used to time out the DV Learning state, and the next transition is into the Forwarding state.

I.C. Storage

Each bridge keeps an FD for the forwarding process. In STAR bridges, three tables are additionally used provided: bridge forwarding table (BF Table), end-station location table (ESL Table), and bridge address table (BA Table). These tables are preferably stored in memory devices already resident in non-STAR bridges, such as memory for storing FD. A BF Table indicates for each other STAR bridge in the bridged LAN the port that leads to the next hop along the "best" path found. BF Tables are obtained in the path finding process by a modified distance vector method as will be described in further detail hereinafter. An ESL Table is used to map an end station to a STAR bridge near it. The STAR learning process is responsible for filling this table. Therefore, if the ESL Table of a STAR bridge has a record for an end station, it is unnecessary for the FD of the STAR bridge to have a record for the same end station in most situations. This implies that the FD in a STAR bridge is no larger than that in a standard bridge. The BA Table is a mapping between STAR bridge identifiers and STAR bridge MAC addresses. Every bridge has its own unique MAC address and this MAC address is used in the STAR forwarding process. It is not necessary for a STAR bridge to know the MAC address of all other STAR bridges. It should be noted that addr(n) will be the MAC address of a bridge with a bridge ID n.

I.D. Protocol Data Units

The STAR Bridge Protocol recognizes two types of protocol data units, namely BPDU (Bridge Protocol Data Units), which is specified in the IEEE 802.1D standard, and SBPDU (STAR Bridge Protocol Data Units), which are specified below for the STAR Bridge Protocol.

The SBPDU contains an SBPDU Header, which has the same format as the BPDU Header, and a set of SBPDU Parameters. The Protocol Identifier in the SBPDU has its own unique value to identify the STAR Bridge Protocol. SBPDU MAC frames assume a format similar to that of BPDU MAC frames. There are four kinds of SBPDU frames: Hello SBPDU, Distance Vector Change Notification SBPDU (DVCN_SBPDU), Distance Vector Computation SBPDU (DVC_SBPDU), and Station Location Announcement SBPDU (SLA_SBPDU). Hello SBPDU is used for monitoring crosslink failures. DVCN_SBPDUs are used to notify STAR bridges about topology changes. DVC_SBPDUs are used in the path finding process to compute the distance vectors and BF Tables. SLA_SBPDUs are generated in the STAR learning process to fill the ESL Tables.

Since any BPDU frame with an unknown Protocol Identifier will not be forwarded by old bridges, an SBPDU frame sent by a STAR bridge must be encapsulated as a data frame if it is expected to traverse at least one old bridge. The source address of an encapsulated SBPDU frame is the MAC address of the STAR bridge that is responsible for the encapsulation. The destination MAC address is either the STAR bridge group MAC address or the unique MAC address of the intended STAR bridge recipient. Which destination MAC address is applicable depends on the specific type of SBPDU MAC frame being sent. In the proposed protocol, most SBPDU MAC frames are sent over the spanning tree. It will be explained herein that some SBPDU MAC frames may be sent to direct STAR neighbors over selected non-tree links. Except in the only case described in with reference to crosslink maintenance and Path Finding Process, an SBPDU MAC frame received by a STAR bridge will not be forwarded by the STAR bridge.

I.E. Data Frames

Each data frame at the LLC Sublayer contains LLC information and is encapsulated within a MAC frame at the MAC layer of the end station. We refer a MAC data frame generated by an end station as a normal MAC data frame, or simply a normal data frame when the context is clear. As will be explained in greater detail hereinafter with reference to the frame dropping problem, a normal data frame may have to be encapsulated by a bridge for forwarding purpose. When a normal MAC data frame is encapsulated, we refer to it as an encapsulated MAC data frame, or simply an encapsulated data frame when the context is clear. We refer to the intended recipient of an encapsulated data frame as a proxy destination, and its address as a proxy destination address. In the rest of this document, the phrase "data frame" refers to either a normal data frame or an encapsulated data frame. We assume that a MAC data frame fr has the form <src(fr), dst(fr), pid(fr)> where src(fr), dst(fr), and pld(fr) represent the source MAC address, the destination MAC address, and the payload data respectively.

Figure 4:
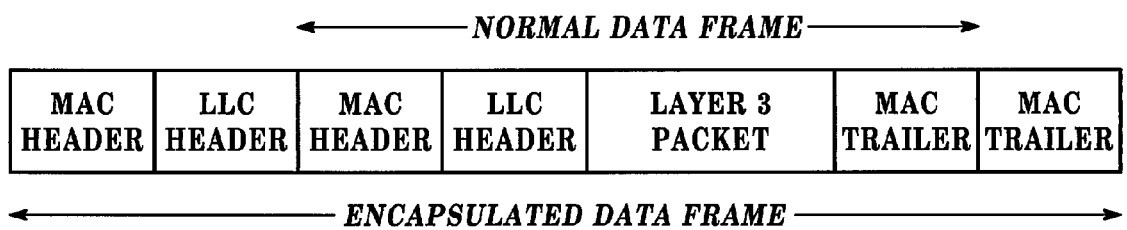
FIG. 4 shows an encapsulated data frame.

A normal MAC data frame consists of a MAC Header, an LLC Header, a layer 3 packet, and a MAC Trailer. When a normal MAC data frame is encapsulated, an additional MAC Header and LLC header are put in the front of the normal data frame and an additional MAC Trailer is put at the end as shown in FIG. 4. Each STAR bridge has to distinguish among the following frames: normal data frames, encapsulated data frames, and encapsulated SBPDU frames. All these frames appear as normal data frames to old bridges. The present invention specifies frame type information in the Protocol Type field of the encapsulating LLC header so that a STAR bridge can correctly identify the frame type and process the frame.

In most bridged LANs, frames are subject to a maximum transfer unit (MTU) constraint. An encapsulated MAC frame of a given size may have to be fragmented before encapsulation, or the resulting frame will violate the MTU constraint. In this respect, STAR bridges must implement a fragmentation and reassembly mechanism to accommodate the encapsulation that may be needed for forwarding certain data frames. It follows that each encapsulated frame must include an additional field to carry an appropriate sequence number. It is sufficient to fragment an oversized frame into two fragments since the encapsulation overhead is much less than an MTU. Hence, only one bit is needed to identify a pair of fragments. Fragmentation and reassembly mechanisms are beyond the scope of the present invention since, frame encapsulation is already an existing function in present day bridges.

I.F. Crosslink Maintenance

Since a crosslink is not part of the active topology of a spanning tree, topology changes that involve crosslinks normally will not trigger a bridge to send out a Topology Change Notification BPDU. Therefore, a mechanism is needed for monitoring and updating the status of each crosslink selected by the proposed protocol for supporting an enhanced forwarding path. Hello SBPDUs and DVCN_SBPDUs are used for this purpose. A Hello SBPDU consists merely of a Protocol Identifier field, a Protocol Version Identifier field, and an SBPDU Type field with a code reserved for this type. A DVCN_SBPDU contains an SBPDU Header and IDs of both bridges on the ends of the crosslink that is being identified to have failed.

In order to detect crosslink failures, STAR bridges on both ends of each crosslink exchange Hello SBPDUs periodically. These Hello SBPDUs are not forwarded by the STAR bridges to their neighbors. Each STAR bridge uses a predetermined timer for each of its crosslink neighbors to time out pending Hello SBPDUs. If a STAR bridge receives a Hello SBPDU from a STAR neighbor over a crosslink before an appropriate timer expires, the STAR bridge resets the timer. Otherwise, the STAR bridge assumes that the crosslink has failed and then transits to the Tree Learned state. In addition, the STAR bridge also multicasts a Distance vector change Notification SBPDU over the IEEE 802.1D spanning tree to all STAR bridges.

When a crosslink is recovered from a recent failure or a new crosslink link is enabled, the STAR bridges on both ends of the crosslink will first check to determine if the crosslink is eligible for supporting an enhanced forwarding path based on information in their respective BF Tables. If the crosslink is eligible, the STAR bridges will each independently multicast a DVCN_SBPDU over the IEEE 802.1D spanning tree to all STAR bridges.

Upon receiving a DVCN_SBPDU, a STAR bridge forwards it to all of its tree neighbors, and transits to the Tree Learned state. The STAR bridge makes use of a timer to remember the identity of the affected crosslink for a predetermined time-out period. When a DVCN_SBPDU identifying a given crosslink is received by a STAR bridge, and if no other DVCN_SBPDU identifying the same crosslink has been received within a current time-out period, the STAR bridge resets the timer and forwards the SBPDU to all its tree neighbors. Otherwise, the SBPDU is dropped.

I.G. Bridge Operation

Figure 5:
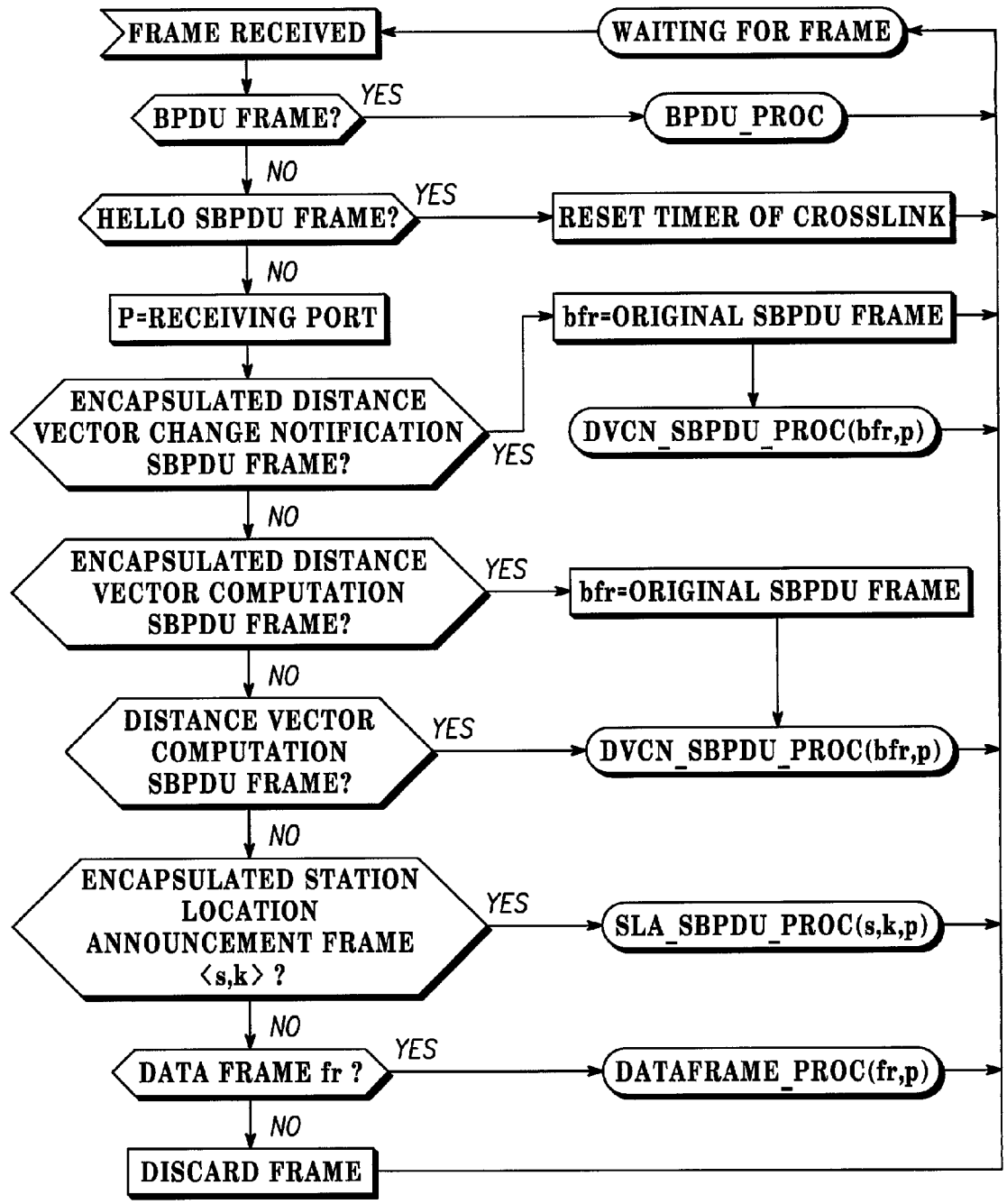
FIG. 5 is a STAR bridge operation flow chart.

As mentioned earlier, there are three kinds of MAC frames a STAR bridge would receive in this protocol: BPDU frames, SBPDU frames, and data frames. FIG. 5 is the STAR bridge operation flow-chart. When a MAC frame is received, it invokes different procedures for different kinds of frame.

Figure 6:
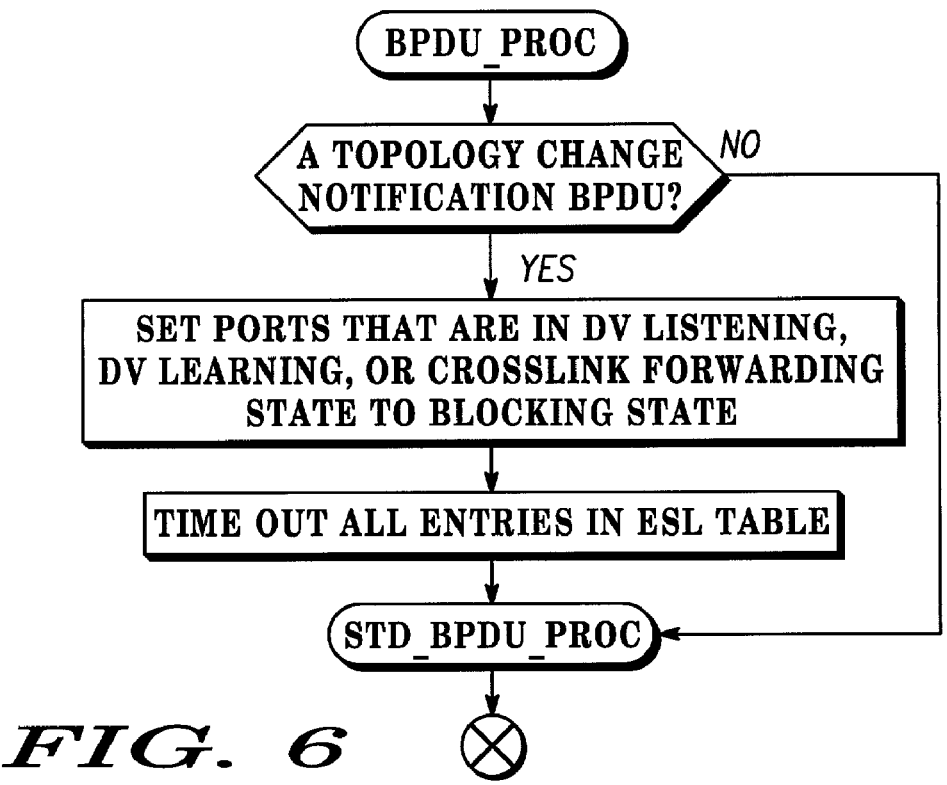
FIG. 6 is a flow chart for the process BPDU_PROC.

BPDU frames received are processed by a procedure BPDU_Proc. FIG. 6 depicts the flow-chart for BPDU_Proc. When a Topology Change Notification BPDU is received, the bridge has to deactivate the non-tree ports selected by the path finding process and invalidate the entries of its ESL table. After that, standard BPDU processing is executed. In FIG. 6, Std_BPDU_Proc refers to the standard BPDU processing procedure, shown in FIG. 21. As the standard BPDU processing procedure can be found in the IEEE 802.1D standard which is incorporated herein by reference, the details of that procedure have been omitted for purposes of brevity.

Figure 7:
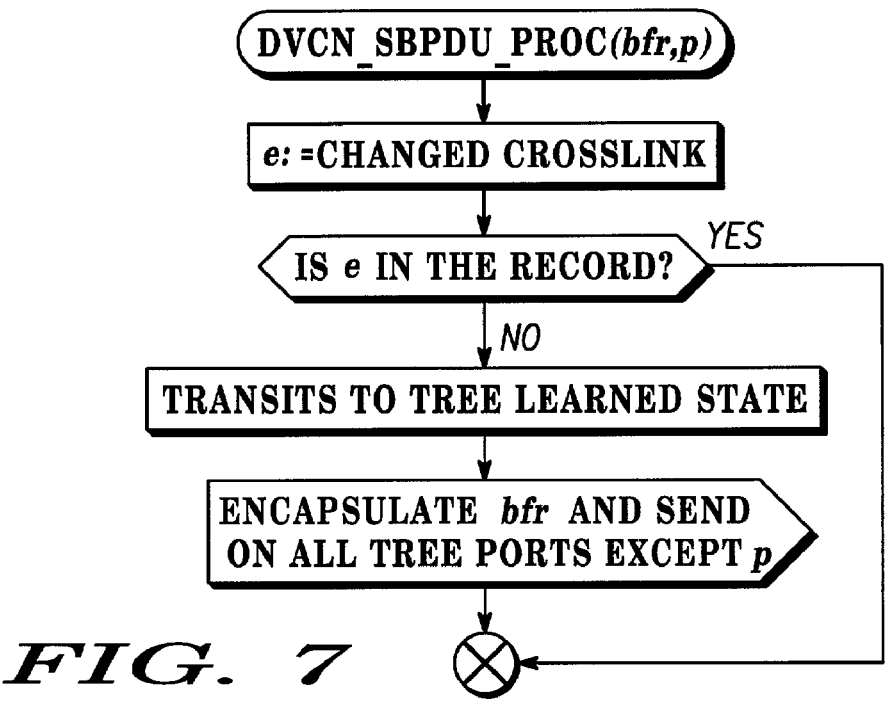
FIG. 7 is a flow chart showing the procedure for processing DVCN_SBPDU frames.
Figure 8:
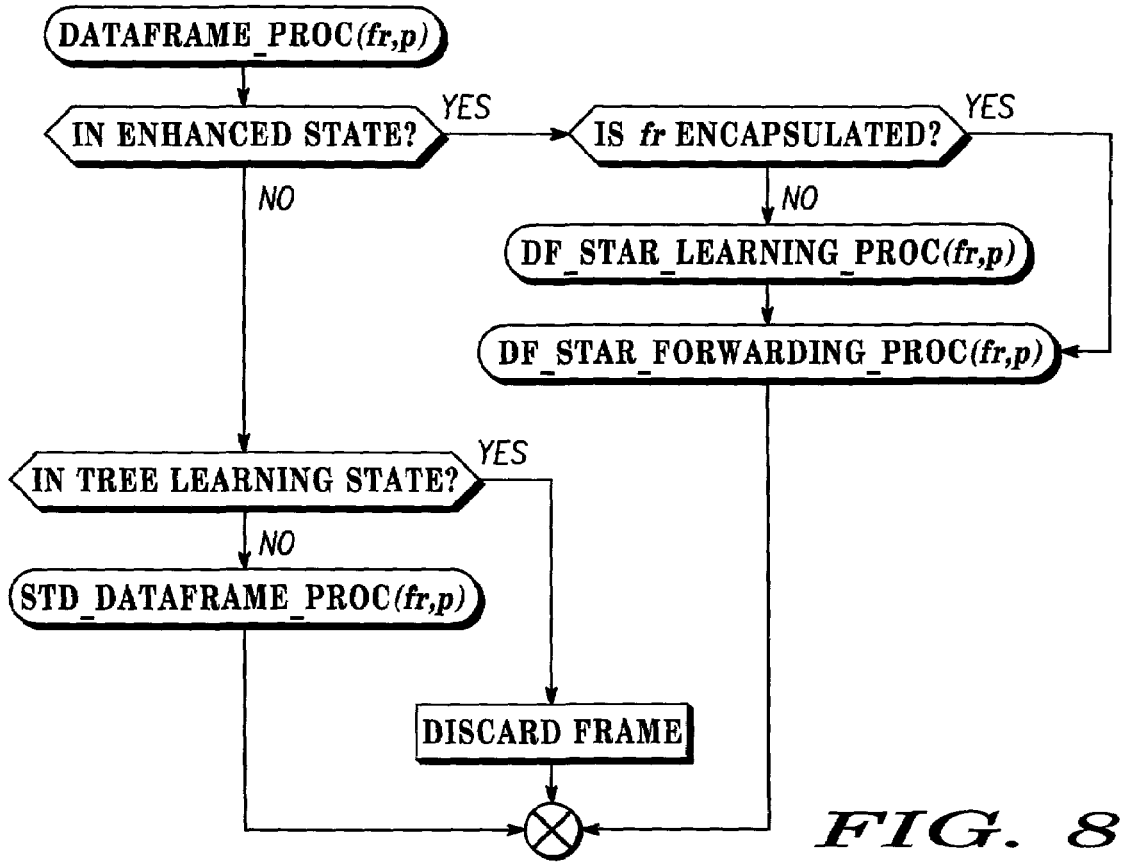
FIG. 8 is a flow chart for the process Data_Frame_Proc.
Figure 9:
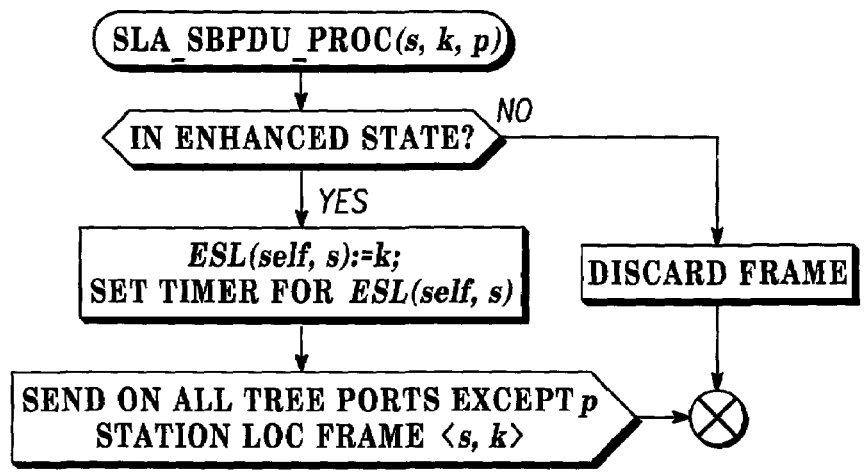
FIG. 9 is a flow chart for process SLA_SBPDU_Proc.
Figure 12:
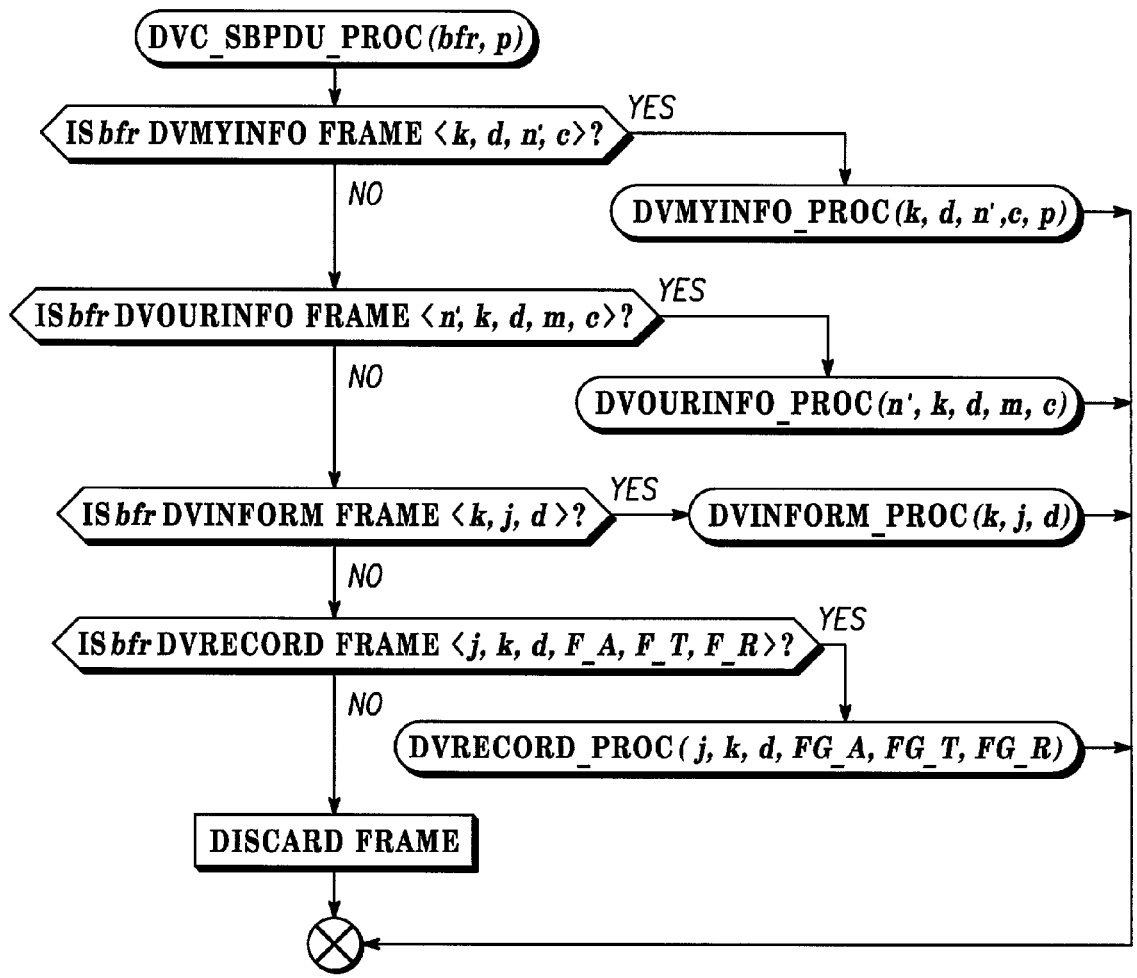
FIG. 12 is a flow chart of the process DVC_SBPDU_Proc.

There are four kinds of SBPDU frames as described in the Protocol Data Units Section. There is a procedure for processing each kind of SBPDU frames. DVCN_SBPDU_Proc procedure is for processing DVCN_SBPDU frames, and the flow-chart for this procedure is shown in FIG. 7. The details of DVC_SBPDU_Proc procedure for processing DVC_SBPDU frames and SLA_SBPDU_Proc procedure for processing SLA_SBPDU frames will be discussed hereinafter with reference to Section V and Section IV respectively. The flow-charts for these procedures are shown in FIG. 12 and FIG. 9 respectively. A STAR bridge invokes a Data_Frame_Proc procedure when a data frame is received. The flow-chart for Data_Frame_Proc is shown in FIG. 8. Different procedures are executed depending on the current state of the bridge. The processing of data frames will be discussed further in Section IV and Section V.

II. Model

In this section, we describe the mathematical model we use in this invention. We will also define the notations for the proposed protocol. A summary can be found in Table A in the Appendix.

In the present invention the bridged LAN is represented as an undirected graph $G=(V, E)$ where V is the set of all bridges and E is the set of links connecting the bridges. Each link $(x, y) \in E$ is assumed to have a non-negative cost $c(x, y)$. For convenience, we let $c(x, y)=\infty$ if $(x, y) \notin E$. If there are several links between bridge x and bridge y, $c(x, y)$ should be the minimum among the costs of the links. A path in G is a loop-free tandem concatenation of links in E. The length of a path is the sum of the costs of all the links along the path. The distance between a pair of nodes, x and y, is the length of a shortest path connecting the nodes.

Bridge x is a direct neighbor of bridge y, and vice versa, if $(x, y) \in E$. $T=(V, E_T)$ is a tree subgraph of G representing an RST, wherein $(x, y) \in E_T$ if and only if $(x, y)$ is an activated link in the RST. The links in $E_T$ are referred to as tree links and the links in $E \backslash E_T$ as non-tree links. If $(x, y) \in E_T$, x and y are tree neighbors. A path in T is a tree path. A tree path originating at bridge s and terminating at bridge t is denoted treepath(s, t). The distance of this tree path is denoted $d_T(s, t)$. Note that $d_T(x, y)=c(x, y)$ if x and y are tree neighbors. We refer to Treepath(s, t) are referred to as an old bridge tree path if it has at least one intermediate bridge (i.e., one other than the source and destination bridges) and every intermediate bridge on the path is an old bridge. B represents the set of STAR bridges. If s and t are STAR bridges, that is, s, t $\in$ B, and there is an old bridge tree path between them, s is a distant STAR neighbor of t, and vice versa. If, in addition, s is an ancestor of t, then s is a unique distant STAR ancestor neighbor of t. Henceforth, the distant STAR ancestor neighbor of a bridge t will be referred to by dsan(t). The set of distant STAR neighbors of n is represented by $N'_B(n)$.

Figure 10:
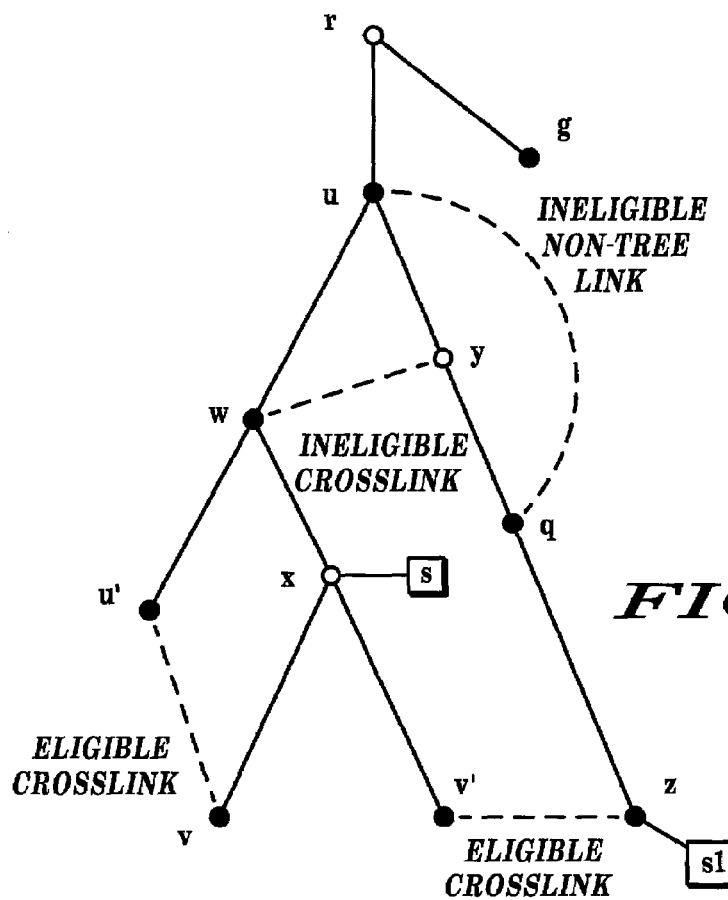
FIG. 10 is a bridged LAN graph useful in explaining the non-tree links between STAR bridges of the present invention.

The nearest common ancestor of x and y is the highest-level bridge on a tree path between x and y. If x is an ancestor of y, then x is necessarily the nearest common ancestor of x and y. Let the nearest common ancestor of x and y be denoted nca(x, y). We say x and y are on different branches if nca(x, y)≠x and nca(x, y)≠y. We call $(x, y) \in E \backslash E_T$ a crosslink if x and y are on different branches. x and y are crosslink neighbors then. FIG. 10 is an example of an undirected graph of a bridged LAN. Node r is the root. The solid lines are links in $E_T$ and the dotted lines are non-tree links. Link (u, q) is a non-tree link but not a crosslink while (w, y), (u', v) and (v', z) are all crosslinks. Therefore, u and q are direct neighbors but neither tree neighbors nor crosslink neighbors. They are distant STAR neighbors though since the path u→y→q is an old bridge tree path. Table 1 summarizes the definitions of different kinds of neighbors.

TABLE 1

| Neighbor Types | |
| --- | --- |
| Neighbor Type | Definition |
| Direct neighbors | x, y ∈ V, (x, y) ∈ E |
| Tree neighbors | x, y ∈ V, (x, y) ∈ $E_T$ |
| Crosslink neighbors | x, y ∈ V, (x, y) ∈ $E \backslash E_T$ and nca(x, y) ≠ x and nca(x, y) ≠ y |
| Direct STAR neighbors | x, y ∈ B, (x, y) ∈ E |
| Distant STAR neighbors | x, y ∈ B, treepath(x, y) is an old bridge tree path |

Since an old bridge sets the port associated with each of its non-tree links to blocking state, there is no way to use any such a link to forward data frames, even though the other side of the link is a STAR bridge. Therefore, a non-tree link may be used only if it connects two STAR bridges. Even so, such a link may not support any shortest path. There is yet another reason that a non-tree link is useless. Consider FIG. 10 where both bridges u and q are STAR bridges. This non-tree link between them is useless because the distance of this link must be larger than the tree path from u to q; otherwise, the spanning tree algorithm would have set q to be a child of u. In FIG. 10, (u, q) and (w, y) are ineligible links. A non-tree link that is obviously useless, as just described, for supporting any shortest path is termed an ineligible link. A non-tree link is termed eligible otherwise. In FIG. 10, (u', v) and (v', z) are eligible crosslinks.

A STAR bridge graph is defined as $G_B=(B, E_B)$ where B is the set of STAR bridges and $(x, y) \in E_B$ if and only if x and y are STAR neighbors, either direct or distant. c'(x, y), the cost of link (x, y), is defined by the following formula.

$$c'(x, y) = \begin{cases} c(x, y) & \text{if } x \text{ and } y \text{ are direct but not distant STAR neighbors} \\ \min(d_T(x, y), c(x, y)) & \text{if } x \text{ and } y \text{ are both direct and distant STAR neighbors} \\ d_T(x, y) & \text{if } x \text{ and } y \text{ are distant but not direct STAR neighbors} \end{cases}$$

Figure 11:
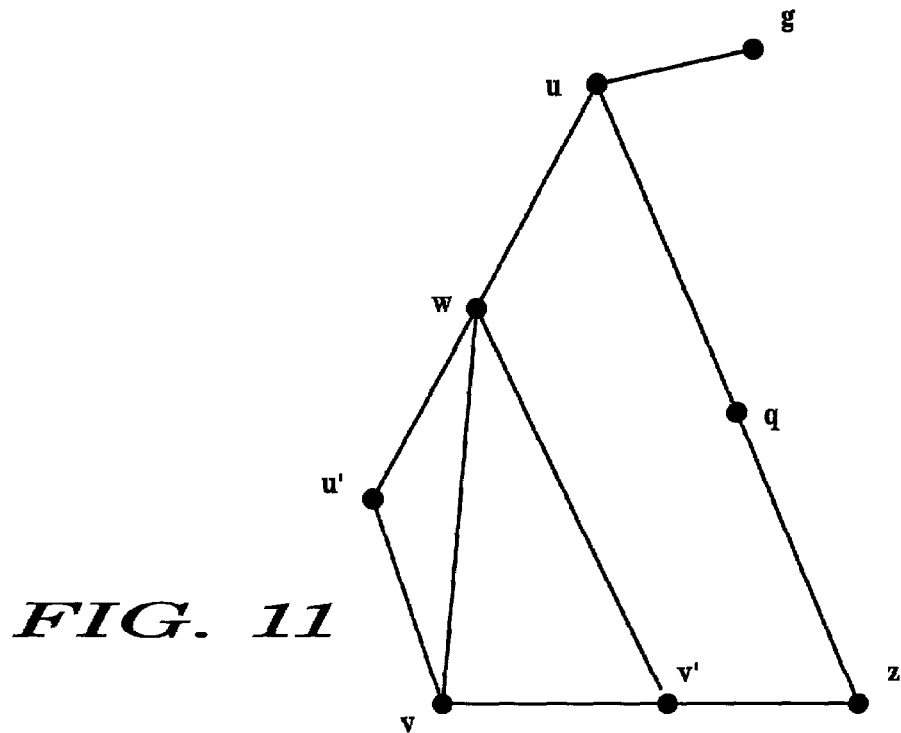
FIG. 11 is an example of a STAR bridge graph.

The STAR bridge graph of FIG. 10 is shown in FIG. 11.

III. Path Finding Process

The goal of this process is to compute the BF Table. In the best case, the BF Table has next hop and forwarding port information associated with a shortest path to a STAR bridge. The STAR bridge graph contains all tree paths among STAR bridges and all eligible non-tree links in the original bridged LAN. Therefore, the shortest path in $G_B$ between a pair of STAR bridges x and y would be the best path which can be achieved in the bridged LAN after pruning ineligible links. Ideally, if every c'(x, y) can be computed correctly, each STAR bridge can compute its own BF Table based on distance vectors. Nonetheless, we will still use a distance vector approach may be used for updating the BF Table, except that some modification as described below is needed.

In a conventional distance vector update protocol, each node initializes its distance vector with distances to all its neighbors. It then sends the distance vector to all its neighbors. When a neighbor receives the distance vector, the neighbor updates its own distance vector if any shorter path is found. This neighbor then sends its update to all its own neighbors. The procedure keeps on going until the algorithm converges.

As there are old and STAR bridges in the bridged LAN, the conventional distance vector update protocol cannot be applied directly. Each bridge knows only the cost to its direct neighbors. If x and y are distant STAR neighbors, both x and y do not know $d_T(x, y)$ since there are one or more old bridges between them. Therefore, a bridge x∈B has to determine $d_T(x, y)$ if y is a distant STAR neighbor. Unfortunately, due to the limitation of old bridges, STAR bridges may not be able to determine every distance correctly. Nonetheless, the distances may be estimated such that each estimated distance is at least its corresponding real distance.

The process for path finding in the proposed protocol consists of two procedures:

Distance Vector Estimation

Distance Vector Enhancement

In these procedures, STAR bridges communicate using Distance Vector Computation SBPDUs. In the Distance Vector Estimation procedure, each STAR bridge initializes the distance to its neighbors in the STAR bridge graph of the bridged LAN. It involves discovery of distant STAR neighbors and computation of the tree path distances as described above. In the Distance Vector Enhancement procedure, which follows the Distance Vector Estimation procedure, STAR bridges exchange their distance vectors, discover other non-neighbor STAR bridges, and find the shortest path to them.

In the process, a STAR bridge n maintains a distance vector only for other STAR bridges known to n. As unknown STAR bridges are discovered by n in the process of the algorithm, a new entry is created in the distance vector maintained by n for each newly discovered STAR bridge. When the process ends, n should have discovered all other STAR bridges and its distance vector will consist of one entry for each STAR bridge n'∈B\{n}. Each entry in the distance vector of n consists of a tuple of seven fields. The entry associated with n' in the distance vector of n is denoted as DVT(n, n'). As summarized in Table 2, the information contained in DVT(n, n') provides an estimated distance between n and n', indicates whether the estimated distance is actually accurate, and enables STAR bridge n to know its forwarding port for n', its next hop STAR bridge neighbor on the forwarding path to n', indicates whether the forwarding path is a tree path, as well as whether n' is an ancestor or a descendant. Incidentally, d(n, n'), the current estimated distance from n to n', will be appropriately initialized as described in Sections III.A and III.B.

TABLE 2

Fields in DVT(n, n') for a Path from n to n'

| Field | Definition |
| --- | --- |
| N' | ID of destination STAR bridge |
| d(n, n') | Estimated distance between n and n' |
| F(n, n') | Forwarding port for n' |
| next (n, n') | ID of the next hop STAR bridge neighbor on the path from n to n' |
| FG_A(n, n') | Distance accuracy flag with a value 1 if d(n, n') is accurate, and 0 otherwise |
| FG_T(n, n') | Tree path flag with a value 1 if the path from n to n' is a tree path, and 0 otherwise |
| FG_R(n, n') | Relation flag with a value 1 if n' is an ancestor of n, −1 if n' is a descendant of n, and 0 otherwise |

III.A Distance Vector Estimation

In the DV Estimation procedure, a STAR bridge n discovers all its STAR neighbors, both direct and distant, that is, the fields in the distance vector of STAR bridge n are filled out for each STAR bridge n'∈B\{n} where (n, n')∈$E_B$. There are two phases in the Distance Vector Estimation procedure. In the first phase, STAR bridge n estimates $d_T(n, n')$ if n' is a distant STAR neighbor and n fills out the entry for n' in DVT(n, n'). Note that d(n, n') is equal to the estimated $d_T(n, n')$ in this phase. In the second phase, n determines and fills out the entry for k if k∈$N_B$(n). If k is a distant STAR neighbor of n, then n replaces d(n, k) by c(n, k) and other fields accordingly only if it is appropriate. This phase will be discussed in more detail later.

Before the spanning tree algorithm starts, each bridge, either old or STAR, should know its own ID and the cost of the link to each of its direct neighbors in the bridged LAN. After the tree has been built, every bridge k will also know its tree links, as well as the root bridge and the root path distance, $d_r(k)$, where bridge r is the root bridge. Incidentally, $d_r(r)=0$. Table 3 is the topology information of bridge v in FIG. 10 after the spanning tree computation. The column Old/STAR is the information obtained by STAR bridges only while all bridges, either old or STAR, obtain all other columns.

TABLE 3

Topology Database of Bridge v

| Bridge | Type | Distance | P(v) | Old/STAR |
|---|---|---|---|---|
| R | Root | $d_r(v)$ | $p_r(v)$ | N/A |
| X | Parent | c(v, x) | p(v, x) | Old |
| U' | Non-tree neighbor | c(v, u') | p(v, u') | STAR |

There are three kinds of DVC_SBPDU frames in the first phase—DVMyInfo, DVOurInfo, and DVInform frames. Table 4 shows the formats of these frames. DVMyInfo frames are used for a STAR bridge to inform other STAR bridges of its own topology information. DVOurInfo frames carry information related to both the source and the destination STAR bridges. DVInform frames allow STAR bridges to pass on topology information of other STAR bridges. DVRecord frames are used in Distance Vector Enhancement and will be described in Section III.B DVC_SBPDU_Proc procedure first identifies the frame and then invokes corresponding procedures. The flow-chart for DVC_SBPDU_Proc is shown in FIG. 12.

Each STAR bridge k sends a DVMyInfo(k) frame on its root link only if its parent is an old bridge. If there is any STAR bridge along the root path of k, the one that is nearest to k, say n, will receive the DVMyInfo(k) frame from a child link. Note that n and k are distant STAR neighbors. n is the distant STAR ancestor neighbor of k and n=dsan(k). Bridge n can determine the tree path distance between k and n, wherein $d_T(n, k)=d_T(k, n)$ is the difference of their root path distances. Then, n informs k of the distance between them by a DVOurInfo(n, k) frame and stops forwarding the DVMyInfo(k) frame. In this case, n and k are on the same branch and n is an ancestor of k. If the STAR bridges are on different branches, like v and v' in FIG. 10, and there is no STAR bridge on the tree path between them, then, since DVMyInfo frames are multicast frames addressed to all STAR bridges, v' will receive the DVMyInfo(v) frame of v and vice versa. However, there is no way for them to calculate the real tree path distance between them using root path distance alone. In the case of v and v', if they know that they have the same parent, they can determine the accurate tree path distance. Therefore, the DVMyInfo(v) frame also contains the information of the parent of v. When v and v' receive each other's DVMyInfo frame through a root link and find out they are siblings, they may calculate the distance between them correctly by adding c(v, parent(v)) and c(v' parent(v')).

TABLE 4

Format of DVC SBPDU Frames

| SBPDU Frame | Format | Source | Destination |
|---|---|---|---|
| DVMyInfo(n) | <n, $d_r(n)$, parent (n), c(n, parent(n))> where parent(n) ∈ V\B | n ∈ B | multicast address of B |
| DVOurInfo(n, n') | <n, n', d(n, n'), cb(n, n'), c(n, cb(n, n'))> where n' ∈ B, and cb(n, n') ∈ V\B | n ∈ B | n' ∈ B |
| DVInform(n, n') | <n, n', d(n, n')> where n' ∈ B\{n} | n ∈ B | k ∈ B\{n} and k ∈ $N_B'(n)$ |
| DVRecord(n, n') | <n, n', d(n, n'), FG_A(n, n'), FG_T(n, n'), FG_R(n, n')> where n' ∈ B\{n} | n ∈ B | k ∈ B\{n, n'} and k ∈ $N_B'(n)$ |

Figure 13:
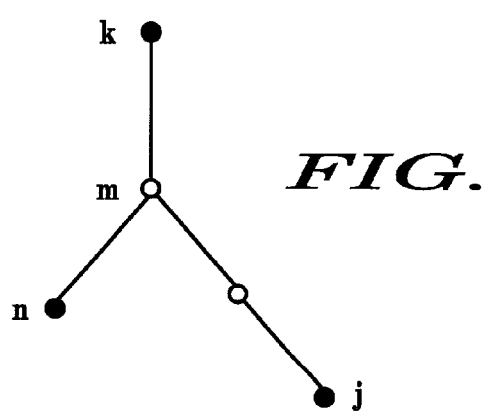
FIG. 13 is a graph useful in explaining the computation of a tree path.

FIG. 13 shows an example in which it is not sufficient to calculate the correct distance. Nevertheless, n and j may obtain an overestimate of the true distance between them by simply adding $d_T(k, n)$ and $d_T(k, j)$. It can be done by requiring k, the distant STAR ancestor neighbor, to send the information $d_T(k, j)$ to n using a DVInform(k, j) frame. If n also knows c(k, m), where m is the child of k on the path to n, it can get an even better estimate. Therefore, m and c(k, m) are sent by k in a DVOurInfo(k, n) frame. Note that m∈V\B. We denote by cb(k, n) the child bridge of k on a tree path leading from k to n. Let dsanc(n) be used by bridge n to keep track of cb(k, n), the child of the dsan(n), and dcc(n) to denote the doubly counted cost of the link between cb(k, n) and k. In this case, dsanc(n) and dcc(n) are respectively set to cb(k, n) and c(k, dsanc(n)).

Figure 14:
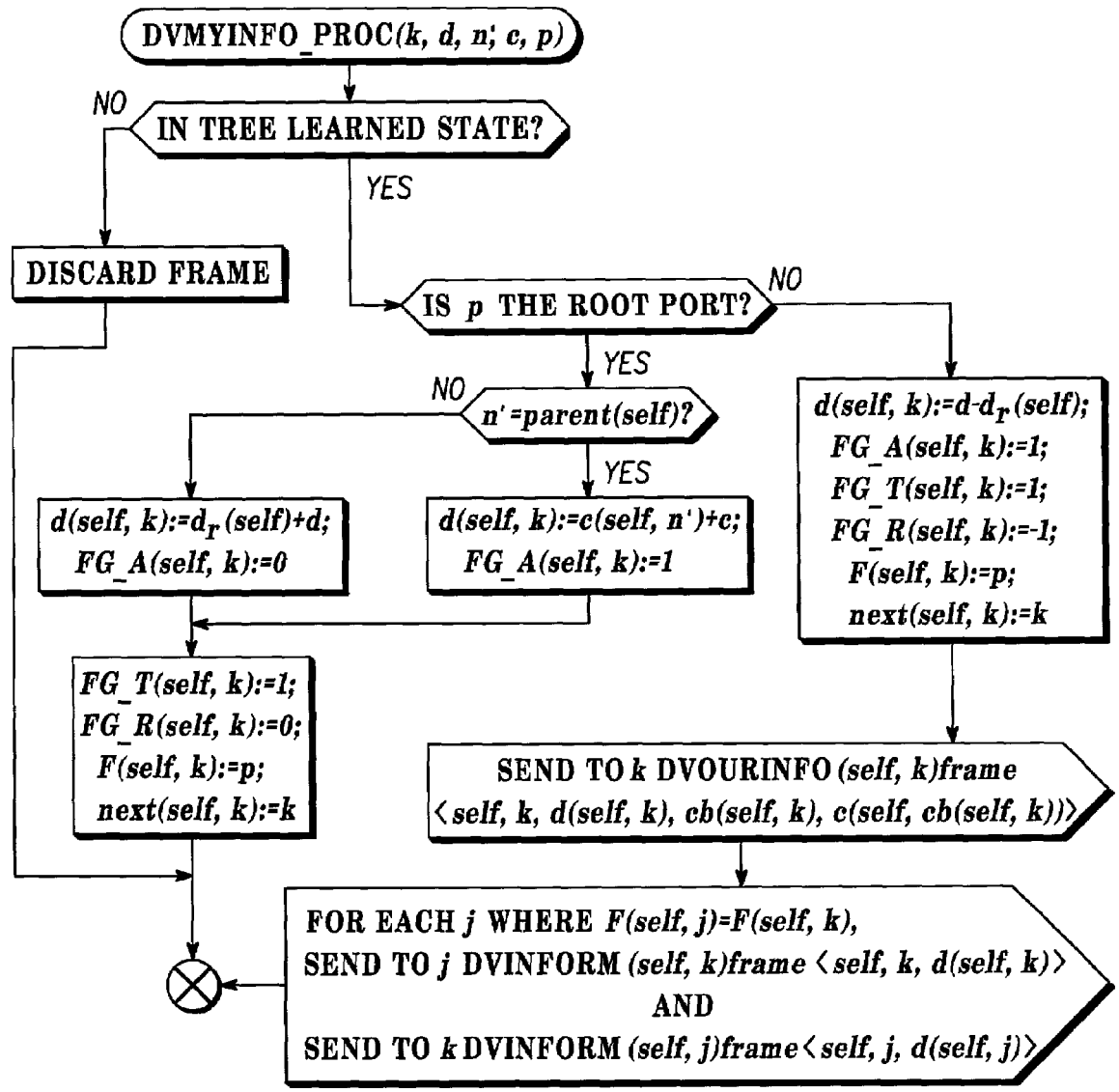
FIG. 14 is a flow chart of the process DVMy Info_Proc.

Upon receiving a DVMyInfo(k) frame<k, d, n', c> from tree port p, a STAR bridge self, with its root path distance $d_r(n)$, processes the frame as in Pseudocode 1. FIG. 14 shows the flow-chart corresponding to Pseudocode 1 (DVMyInfo_Proc). When p is a child port, k is a descendant of self and self can calculate the tree path distance between them and inform k. There are two cases of interest in the processing of a DVMyInfo frame when p is a root port. In Case 1.1, bridges self and k are siblings with a common old bridge parent. In Case 1.2, self and k are on different branches but they are not siblings and the distance d(self, k) evaluated in this case may be incorrect. It is correct only if the nearest common ancestor of self and k is the root bridge.

Figure 15:
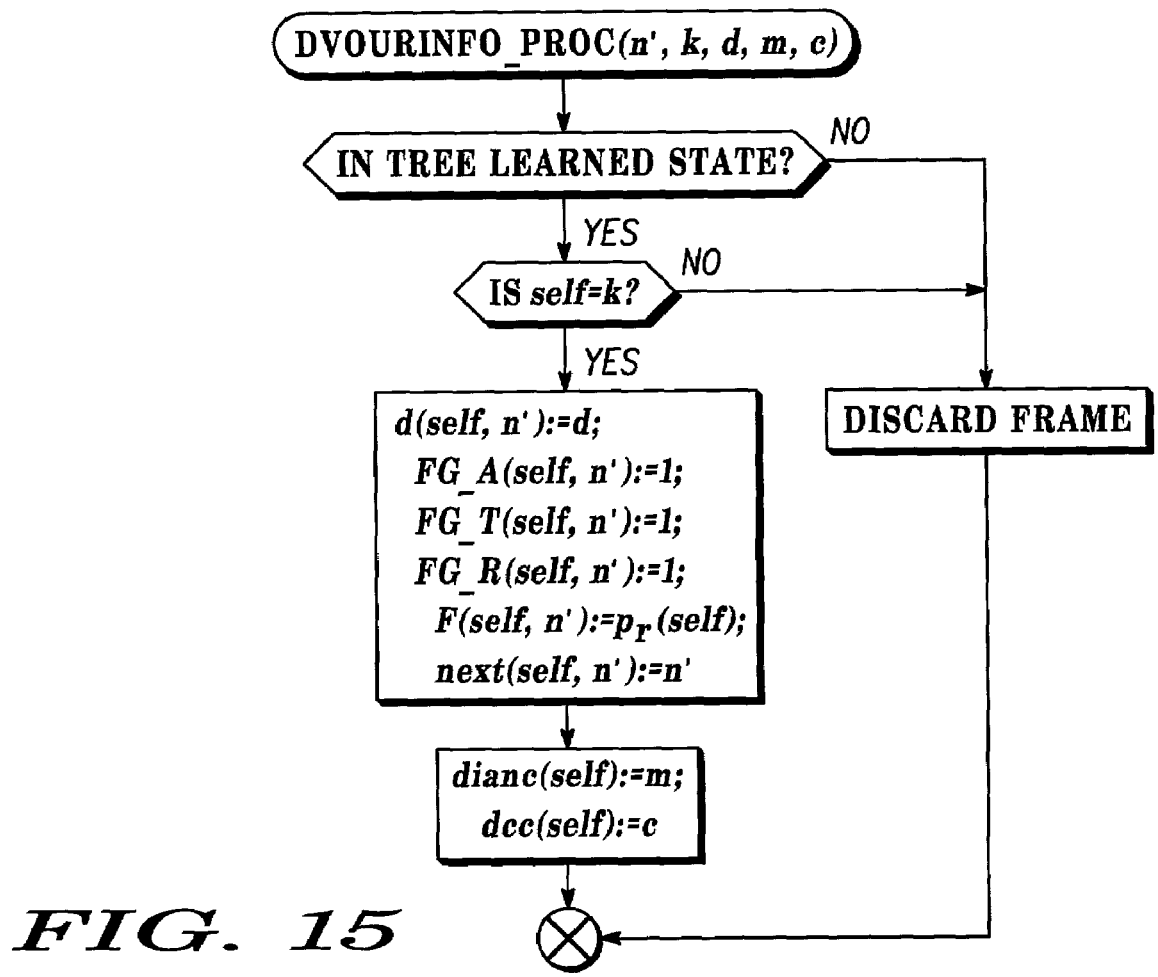
FIG. 15 is a flow chart of the process DVOur Info_Proc.

If n and k do have a STAR common ancestor n', n can estimate d(n, k) better when it receives the DVOurInfo(n', n) and DVInform(n', k) frames from n'. STAR bridge self processes DVOurInfo frame <n, k, d, m, c> as in Pseudocode 2. FIG. 15 shows the flow-chart corresponding to Pseudocode 2 (DVOurInfo_Proc).

Figure 16:
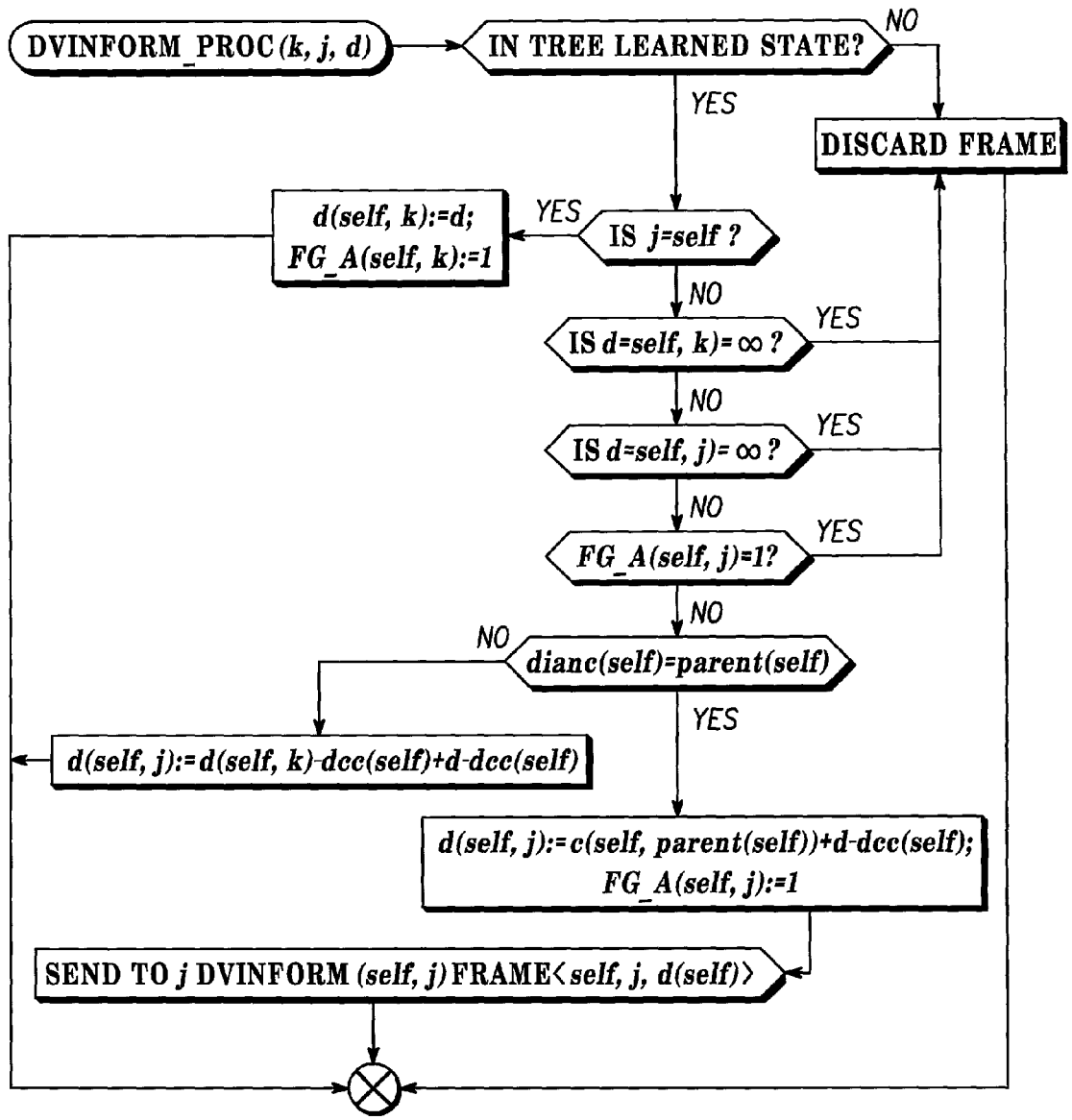
FIG. 16 is a flow chart of the process DV Inform_Proc.

Each STAR bridge n receives at most one DVOurInfo(n' n) frame, and this frame must be sent from dsan(n), which is n'. In Pseudocode 2, the frame DVOurInfo(n' k) is dropped when self≠k because the recipient of the frame is self and there is no other STAR bridge along the path from self to n'. In Pseudocode 1, a DVOurInfo(n', n) frame is sent before sending any DVInform frame. As a DVInform frame will not propagate beyond its distant STAR neighbors and bridges do not reorder frames, we can conclude that n receives the DVOurInfo(n', n) frame before receiving any DVInform frame sent by n'. Therefore, when bridge n receives a DVInform(n', j) frame <n', j, d>, it should have dsanc(n) and dcc(n) correctly assigned. The pseudocode for bridge self to execute when the DVInform(k, j) frame <k, j, d> is received is shown in Pseudocode 3. FIG. 16 shows the flow-chart corresponding to Pseudocode 3.

A STAR bridge self processes a DVInform(k, j) frame <k, j, d> according to the following different situations:

Case 3.1: self=j, that is, k is informing self the distance between them

Case 3.2: self≠j, and, either d(self, k) or d(self, j) is unknown

Case 3.3: self≠j, d(self, j) is estimated

Case 3.3a: parent(self)=dsanc(self)

Case 3.3b: parent(self)≠dsanc(self)

Case 3.4: self≠j, d(self, k) is known, and d(self, j) is accurate

If d(self, j) is accurate, the bridge self does not have to do anything. In Case 3.3 when FG_A(n, j)=0, it means d(self, j) is an estimate and so a better estimate can be obtained. Case 3.3a is the situation where dsanc(self) is the nearest common ancestor of self and j. As a result, self can calculate the distance correctly. Since j may not be able to do so (see FIG. 13), self has to inform j by a DVInform(self, j) frame. When j receives that, which is Case 3.1, it can enhance the distance. Case 3.3b is the situation that accurate distance cannot be found but the estimated distance can be improved by taking out the doubly counted cost dcc(n). Since DVInform frames are sent after DVOurInfo and DVMyInfo frames, Case 3.2 occurs only if there is an error.

Ultimately, the first phase must terminate. When it terminates, n should have a correct or an overestimate $d_T(n, n')$ for every distant STAR neighbor n'. We then proceed to the second phase, that is, each STAR bridge n will fill out DVT(n, k) if k is a direct STAR neighbor of n. If k is a tree neighbor, n should know c(n, k) from the topology database, it can initialize the entry DVT(n, k) to be (c(n, k), p(n, k), k, 1, 1, 1) if k is a parent and (c(n, k), p(n, k), k, 1, 1, −1) if k is a child. If k is a crosslink neighbor, there are two cases. If k is not a distant STAR neighbor, n doesn't have DVT(n, k) yet and so initializes it to be (c(n, k), p(n, k), k, 1, 0, 0). On the other hand, if k is also a distant STAR neighbor, d(n, k) should, if possible be assigned to be min($d_T$(n, k), c(n, k)), and other fields accordingly. If the estimated $d_T$(n, k) is surely correct, that is, if FG_A(n, k)=1, it is trivial. Unfortunately, $d_T$(n, k) may be incorrect. Since we are not sure whether the direct link (n, k) is shorter than the tree path from n to k, $d_T$(n, k) won't be replaced in order to avoid selecting a link with a larger distance than its corresponding tree path. The same applies whenever the distance vector is enhanced. When the tree path distance between a pair of STAR bridges is only an estimate, the tree path won't be replaced between them by a non-tree path. Therefore, when the distance vector becomes stable, d(n, n')≤$d_T$(n, n') for all n, n'∈B such that n≠n'.

Pseudocode 1: DVMyInfo_Proc

PROCEDURE: DVMyInfo_Proc(k, d, n', c, p), also see FIG. 14.

```
Begin
    If p = p_r (self)    /* p is the root port, self and k
                           are on different branches */
        If parent(self) =    /* Case 1.1: self and k are siblings */
        n'
            d(self k) := c(self, n') + c ;
            FG_A(self, k) := 1
                             /* Case 1.2: self and k are not siblings */
        Else
            d(self, k) :=    /* overestimated d(self, k) */
            d_r(self)+ d ;
            FG_A(self, k) := 0
        Endif
        F(self, k) := p ;
        next(self, k) := k ;
        FG_T(self, k) := 1 ;
        FG_R(self, k) := 0
    Else                 /* p is a child link port, i.e.,
                           self is an ancestor of k */
        DVT(self, k) := (d − d_r(self), p, k, 1, 1, −1) ;
        Send DVOurInfo(self, k) frame to k
            <self, k, d(self, k), cb(self, k), c(self, cb(self, k))>
        For each bridge j where F(self, j) = F(self, k)
                             /* j and k are from the same child port */
            Send to j DVInform(self, k) frame
                <self, k, d(self, k)>
            Send to k DVInform(self, j) frame
                <self, j, d(self, j)>
    endif
end
```

Pseudocode 2: DVOurinfo_Proc

PROCEDURE: DVOurInfo_Proc(n', k, d, m, c), also see FIG. 15.

```
Begin
    If self ≠ k        /* error */
        Drop the frame
    Else
        d(self, n') :=d ;
        F(self, n') := p_r(self) ;
        next(self, n') := n' ;
        FG_A(self, n') := 1 ;
        FG_T(self, n') := 1 ;
        FG_R(self, n') := 1 ;
        dsanc(self) := m;
        dcc(self) := c
    endif
end
```

Pseudocode 3: DVInform_Proc

PROCEDURE: DVInform_Proc(k, j, d), also see FIG. 16.

```
Begin
    If j = self                                      /* Case 3.1 */
        d(self, k) := d ;
        FG_A(self, k) := 1
    Else If d(self, k) is unknown or                 /* Case 3.2 */
    d(self, j) is unknown
        Drop the frame
    Else if FG_A(self, j) = 0                        /* Case 3.3 */
        If parent(self) = dsanc(self)                /* Case 3.3a */
            d(self, j) := c(self, parent(self)) + (d − dcc(self));
            FG_A(self, j) := 1 ;
            Send DVInform frame < self, j, d(self, j)> to j
        Else                                         /* Case 3.3b */
            d(self, j) := (d(self, k) − dcc(self)) + (d − dcc(self))
        endif
    endif
end
```

III.B Distance Vector Enhancement

Figure 17:
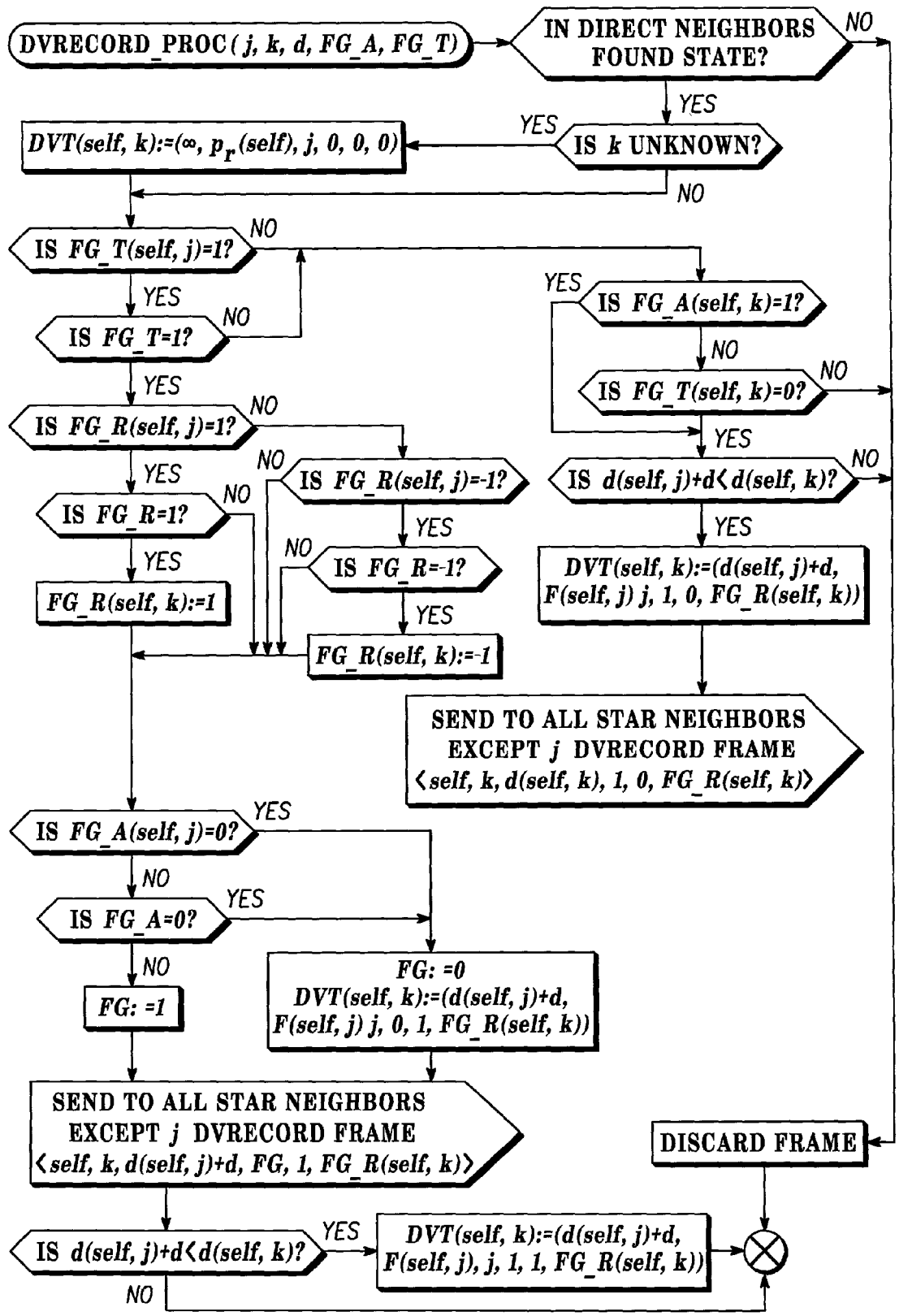
FIG. 17 is a flow chart of the process DV Record_Proc.

The DV Enhancement procedure is similar to the distance vector exchange procedure in the traditional approach except that we can replace a tree path only if its exact distance is known. That is, d(n, n') in the distance vector can be replaced only if FG_A(n, n')=1 or FG_T(n, n')=0. On the other hand, if a tree path from n to n' is found and $d_T(n, n)$ is only an estimate, it replaces d(n, n') in the distance vector. After the DV Estimation procedure, bridge n only knows the tree distance, either correct or estimate, to its tree neighbors and distant STAR neighbors. In order to let a bridge identify whether a path to a formerly unknown bridge is a tree path and whether the tree path distance is correct, the accuracy flag and the tree path flag must be put in the DVRecord frames. The format of a DVRecord(n, n') frame sent by bridge n is <n, n', d(n, n'), FG_A(n, n'), FG_T(n, n'), FG_R(n, n')>. Pseudocode 4 is the DV Enhancement procedure of STAR bridge self upon receiving DVRecord(j, k) frame <j, k, d, FG_A FG_T, FG_R>. FIG. 17 shows the flow-chart corresponding to Pseudocode 4 (DVRecord_Proc).

In Pseudocode 4, when the path from self to j and the path from j to k are both tree paths, the path from self to k through j must be a tree path too. This is Case 4.1. FG_R(self, k) flag is updated accordingly and the tree path information is sent to other STAR neighbors so that the other STAR tree neighbors discover the tree path leading to k. If the tree path distance is an estimate, it always replaces the existing DVT(self, k); otherwise, it replaces only if it is better in terms of distance. Case 4.2 is the case where a non-tree path is found. If the existing DVT(self, k) is not an estimated tree path, it can be replaced if the newly found path is shorter. After the algorithm converges, the distance vector can be reduced to the BF Table. Bridge n has to keep F(n, n') and next(n, n') for every bridge n'∈B\{n} for forwarding purpose. A path in the BF Table between a pair of STAR bridges is referred to as a STAR forwarding path. Note that a STAR forwarding path may be a standard tree path or an enhanced forwarding path when it can be identified.

---

Pseudocode 4: DVRecord_Proc

---

PROCEDURE: DVRecord_Proc(j, k, d, FG_A, FG_T, FG_R), also see FIG. 17.

```
Begin
    If k is unknown                                         /* k is newly discovered */
        DVT(self,k) := (∞,p_r(self), j, 0, 0, 0)            /* initialize DVT (self, k) */
    Endif
    If FG_T(self, j) = 1 and FG_T = 1                       /* Case 4.1: a tree path to k is found */
        If FG_R(self, j) = 1 and FG = 1                     /* k is an ancestor of self */
            FG_R (self, k) := 1
        Else if FG_R (self, j) = -1 and FG_R = -1           /* k is a descendant of self */
            FG_R (self, k) := -1
        endif
        If FGA (self, j) = 0 or FG_A = 0                    /* tree path distance is a estimate */
            FG := 0
            DVT (self, k) := (d(self, j) + d, F(self, j), j, 0, 1, FG_R (self, k))
        Else
            FG := 1
        Endif
        Send DVRecord <self, k, d(self,j) + d, FG, 1, FG_R (self,k)>
            to all STAR neighbors except j
        If d(self, j) + d < d(self, k)                      /* tree path distance is correct and better */
            DVT(self, k) := (d(self, j) + d, F(self, j), j, 1, 1, FG_R(self, k))
        endif
    Else                                                    /* Case 4.2: a non-tree path is found */
        If FG_A(self, k) = 1 or FG_T(self, k) = 0           /* original path can be replaced */
            If d(self, j) + d < d(self, k)
                DVT(self, k) := (d(self, j) + d, F(self, j), j, 1, 0, FG_R(self k))
                Send DVRecord < self, k, d(self, k), 1, 0, FG_R(self, k)> to
                    all STAR neighbors except j
            endif
        endif
    endif
end
```

IV. STAR learning process

When the path finding process is done, a STAR bridge should have filled its BF Table. It then starts the STAR learning process and the STAR forwarding process to forward data frames. The BF Table alone is not enough to forward a data frame since the data frame contains the address of an end station instead of a bridge. Therefore, the STAR learning process has to learn the location of end stations and store the information. An ESL Table is used to map end stations to STAR bridges.

IV.A Designated Bridge and Agent Bridge

Each LAN has a designated bridge and this bridge is also the designated bridge of all end stations attached to that LAN. The designated bridge of an end station s to is designated to be db(s). A designated bridge may be an old bridge or a STAR bridge.

If an end station can be mapped to its "closest" STAR bridge, as the distance vector is correct, the bridges will forward the frame according to a STAR forwarding path. This is called this "closest" bridge the agent bridge of the end station. This agent bridge must be a STAR bridge for the BF Table contains STAR bridges only. Once a STAR bridge identifies itself to be an agent bridge of a formerly unknown end station, it is responsible to tell other bridges so that they know where to forward a frame destined for that station. This can be done by using Station Location Announcement SBPDU frames. For convenience, we refer a Station Announcement SBPDU frame as a StationLoc frame. The destination address of all StationLoc frames is the multicast address of bridge group B. Let the format of a StationLoc frame be <end station address, agent bridge ID>. The expression ESL(n, s) represents ab(s) in the ESL Table of n.

The designated bridge is a suitable candidate to be an agent bridge if it is a STAR bridge. If the designated bridge is a STAR bridge, it can announce itself to be the agent bridge. However, an old bridge does not do that. As a result, we need to find a STAR bridge that is reasonably close to the old, designated bridge of the end station to be the agent. When an old bridge forwards a data frame, it may send it to more than one child link but at most one root link. Therefore, it would be undesirable to have a STAR bridge on the downstream to be an agent for we may end up having more than one agent. Among all the STAR bridges along the upstream, the one closest to the old bridge is preferred. However, there are situations that no agent bridge is identified. For example, if the designated bridge is the root that is an old bridge, all the STAR bridges will be on downstream and so no bridge will declare as the agent bridge. In that case, the tree path is used for forwarding and we record the forwarding port in the FD as what the old bridges do. We say the agent bridge is undefined for an end station if there is no bridge declared as the agent. In other words, the agent bridge is unknown to all STAR bridges.

IV.B End Station Location Table

Each entry in the ESL Table of STAR bridge n is a tuple (s, ab(s)) where s is an end station and ab(s) is the agent bridge of s. Each such entry in the ESL Table of n is created when an unknown end station is newly discovered by n.

Each entry in the FD of STAR bridge n indicates a forwarding port of n for an end station s, that is f(n, s). Each such entry in the FD of n is created when an unknown end station is newly discovered by n.

The STAR learning process of STAR bridges is responsible for filling out these entries. STAR bridge n fills out the ESL Table using the information in the StationLoc frames received. The FD can be filled as in the IEEE 802.1D standard, in which case n records the port from where a normal data frame arrives. The set of end stations in the ESL Table of n is H(n) and the set of end stations in the FD of n is S(n).

An end station s is referred to as a known end station with respect to n if s∈H(n)∪S(n); s is unknown otherwise. Note that, after timing out old entries in the FD, H(n)∩S(n) is a set of end stations where the agent bridge of each of the end stations is n. In addition to filling out the ESL Table and FD, n should be able to identify whether it is the agent bridge of an end station s when a normal data frame from s is received.

IV.C Procedures for STAR Learning Process

Figure 18:
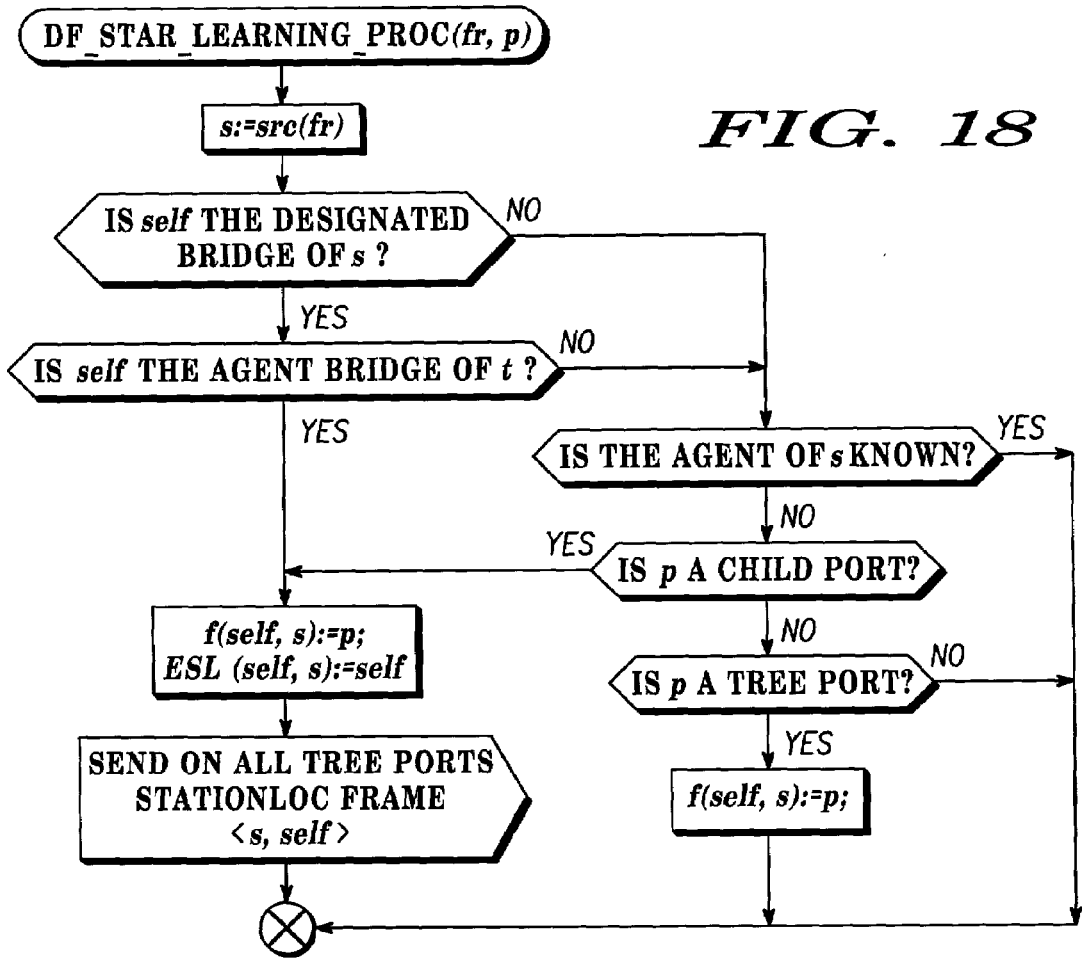
FIG. 18 is a flow chart of the process DF_STAR_Learning_Proc.
Figure 19:
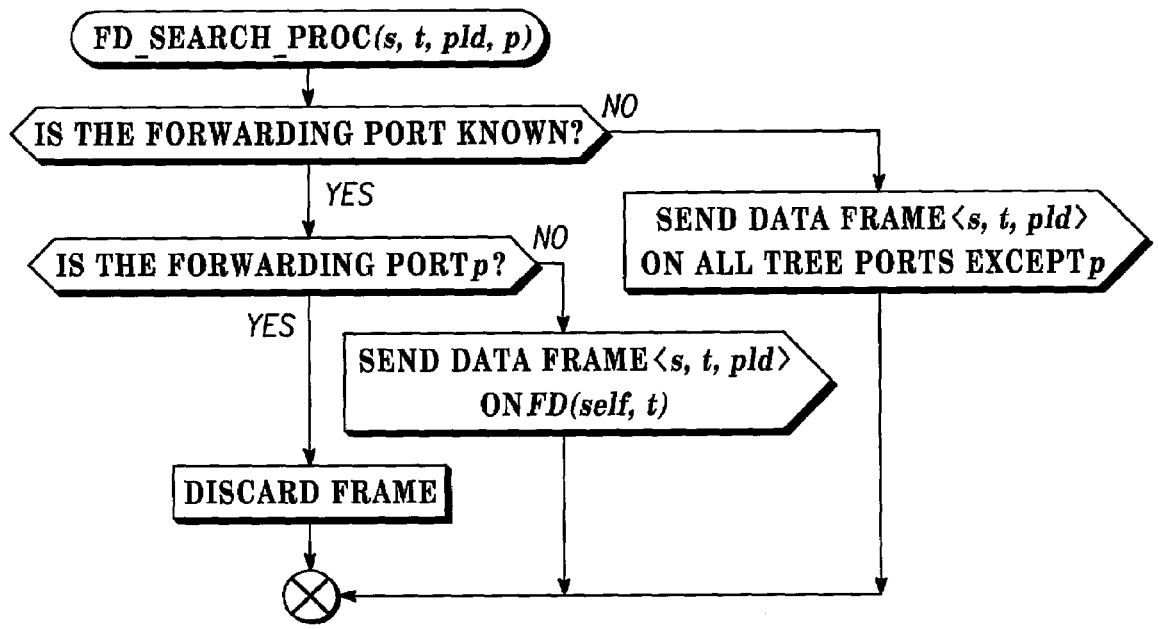
FIG. 19 is a flow chart of the process FD_Search_Proc.

Whenever a STAR bridge is in the Enhanced state, it executes the STAR Learning process. The bridge invokes a SLA_SBPDU_Proc procedure upon receiving a StationLoc frame, and a DF_STAR_Learning_Proc procedure upon receiving a normal data frame. The pseudocodes for these procedures are shown in Pseudocode 5 and Pseudocode 6 respectively. In both pseudocodes, whenever an entry in the ESL Table or the FD is updated or created, its corresponding timer is reset. FIG. 18 and FIG. 19 show the flow-charts corresponding to Pseudocode 5 and Pseudocode 6 respectively.

The SLA_SBPDU Proc procedure is used by a STAR bridge to update its ESL Table and to propagate agent bridge information to its STAR neighbors. Specifically, upon receiving a StationLoc(s) frame <s, k> from tree port p, a STAR bridge self assigns k, the agent bridge of s, to ESL(self, s), and then forwards the StationLoc(s) out of all its tree ports except p.

The DF_STAR Learning_Proc procedure is used by a STAR bridge to update its FD and ESL Table upon receiving a normal data frame fr. The procedure is also used by the STAR bridge to discover if it is an agent bridge for src(fr), and if so, the STAR bridge forwards a StationLoc(src(fr)) out of appropriate tree ports.

As specified in Pseudocode 6, when self is the designated bridge but not the agent bridge of the source end station s (Case 6.1), it sends a StationLoc(s) frame on all tree ports and updates the FD entry and ESL Table entry for s. If ab(s) is unknown (Case 6.2), self has to check whether it is ab(s). If ab(s)≠db(s), then ab(s) is the closest upstream STAR bridge and so ab(s) must receive the normal data frame of s from a child link port (Case 6.2a). The agent bridge sends the StationLoc(s) frame on all tree ports. Therefore, those STAR bridges in higher levels of the spanning tree will receive the StationLoc(s) frame before the normal data frame. They should have an entry for s in their ESL Tables by the time they receive the normal data frame and won't send out another StationLoc(s) frame.

Pseudocode 5: SLA_SBPDU_Proc

PROCEDURE: SLA_SBPDU_Proc(s, k, p), see also FIG. 9

```
Begin
    ESL(self, s) := k;              /* fill the ESL Table */
    Send StationLoc(s) frame on all tree ports except p
end
```

Pseudocode 6: DF_STAR_Learning_Proc

PROCEDURE: DF_STAR_Learning_Proc(fr, p), see also FIG. 18

```
/* fr is a normal data frame */
Begin
    s := src(fr)
    If db(s) = self and ab(s) ≠ self    /* Case 6.1: self is the designated
                                           bridge and current agent bridge
                                           is not self */
        Send Station Loc(s) <s, self> frame on all tree ports
        f(self, s) := p;
        ESL(self, s) := self
    Else if ab(s) is not found           /* Case 6.2: agent bridge
                                            not known */
        If p is a child port             /* Case 6.2a: p is a child
                                            link port */
            Send StationLoc(s) <s, self> frame on all tree ports
            f(self, s) := p;
            ESL(self, s) := self
        Else if p is a root port
            f(self, s) := p
end
```

V. STAR forwarding process

STAR bridges execute the STAR forwarding process after the STAR learning process when a data frame is received. Having received a data frame destined for an end station t, a STAR bridge n first checks its ESL Table to determine if it knows ab(t), the agent bridge of t. If ab(t) is found, n will then find out from its BF Table the forwarding port of ab(t). If no entry for ab(t) is found in the BF Table, the data frame is dropped because it indicates an error in the BF Table. Since the agent bridge is a STAR bridge, the BF Table should have a record showing how to get there. If ab(t) is unknown, n will proceed to check its FD. If end station t is unknown, STAR bridge n will forward the data frame on all tree ports except the incoming one, just as the IEEE 802.1D standard.

V.A Frame Duplication Problem

In the IEEE 802.1D standard, although a bridge may forward the same frame on more than one port, only one port leads to the destination and the designated bridge of the destination since there is a unique path from any source to any destination on a spanning tree. Therefore, an old bridge can never receive the same data frame more than once. As the STAR bridge graph may not be a tree, two STAR bridges may receive the same data frame and try to forward it to the destination using different paths. For example, suppose that the destination end station is attached to u' and the source end station is attached to x in FIG. 10. If x forwards one copy of the data frame to w and one to v, u' may receive two copies of the same data frame, one from w and one from v. The STAR Bridge Protocol avoids this by allowing only w, the agent bridge of s, to forward the frame using, in this case, an enhanced forwarding path. Since the agent bridge is unique, at most one copy of the frame may be sent to the destination.

V.B Frame Dropping Problem

Another problem is due to the existence of old bridges. Although the STAR bridges know how to forward a frame on an enhanced forwarding path after knowing the location of the destination, old bridges don't. In some cases, old bridges will drop a frame trying to pass through. In FIG. 10, bridges w, x, and v' are on the same branch and there is a crosslink between v' and z. Let z be the designated bridge of end station s1. As x and z are on different branches, in the FD of x, it marks the root port as the forwarding port of s1. However, if w wants to send a frame to s1 and finds out the shortest path to z is going through v', it sends the frame with destination address s1 to x. The frame will be dropped by x since it is coming from the forwarding direction. To fix this problem, we will encapsulate the normal data frame with an appropriate proxy destination address so that x will forward the frame towards v', but not other directions as in Section I.E. An old bridge may drop a data frame only if the data frame is being forwarded on a tree path. It also implies that the frame is trying to go from one STAR bridge to another through an old bridge tree path between them. If the destination address of a frame is the MAC address of the next hop bridge, all the old bridges along the tree path will forward the frame to the next hop as desired. In the present example, w encapsulates the frame with the MAC address of v' as a proxy destination address, such that x, upon receiving the encapsulated frame, will forward the frame to v' without dropping it. In general, when the next hop STAR bridge is not a tree neighbor, the sender STAR bridge will encapsulate the data frame. Since the encapsulated data frames are encapsulated using the sender STAR bridge MAC address as the source address, old bridges will learn the forwarding directions to the sender STAR bridge. In this respect, no additional control message is needed to enable old bridges to learn the forwarding direction to any STAR bridge.

A BA Table is used to keep the MAC addresses of all distant STAR neighbors. Since STAR bridge n puts its MAC address as the source address of the DVMyInfo and DVOurInfo frames it sends, we don't need an extra SBPDU frame to fill this table.

V.D Redundant Traversal Problem

The encapsulation approach described in Section V.B may prevent a designated old bridge from identifying a normal data frame that is destined to it. Referring to the configuration in FIG. 10, let end station s be attached to the old bridge x. According to the protocol, STAR bridge w will declare itself to be the agent bridge of s, so that all frames destined for s will be forwarded as though they were destined for w. Suppose that s1 wants to send a frame to s. STAR bridge z, which is db(s1), will forward the frame via a crosslink to v' then. Since the next hop to a STAR bridge is w and it is on a tree path, v' will encapsulate the frame with w as a proxy destination. When old bridge x receives the frame, it will think that it is not a frame addressed to itself and forward it to the proxy destination w. When w receives it, it will strip off the encapsulation header and send the normal data frame back to x. Then, x can identify the frame and send it to the destination end station. Therefore, the data frame traverses a redundant path from the designated bridge to the agent bridge and back to the designated bridge. In the case where the agent bridge of source end station, ab(s), and the agent bridge of the destination end station, ab(t), are on different branches, we will show later in Section VII.C. that the total distance traversed is still no worse than the corresponding tree path. However, when ab(s) and ab(t) are on the same branch, the total distance traversed may be longer than the tree path. We avoid this by not encapsulating the normal data frame in this situation. To let the next hop STAR bridge know whether a frame is intended to be forwarded on an enhanced forwarding path or a tree path, the agent bridge always encapsulates a frame that is going to be forwarded on an enhanced forwarding path.

V.E Procedure for STAR Forwarding Process

Figure 20:
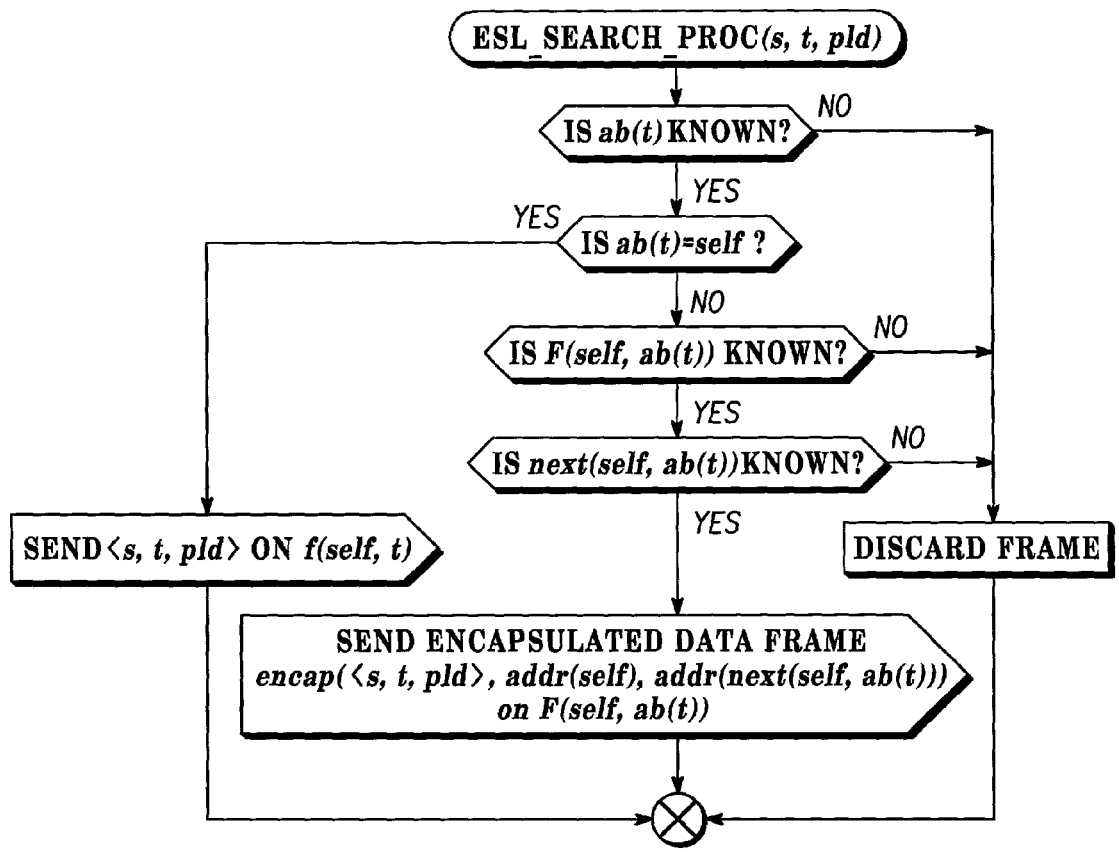
FIG. 20 is a flow chart of the process ESL_Search_Proc.

To avoid unnecessary frame dropping, STAR bridge n encapsulates a normal data frame as discussed in Section I.E. In the encapsulated data frame, the MAC address of n is used as the source address and the MAC address of the next hop STAR bridge is used as the destination address. Given a data frame fr, if it is a normal data frame, src(fr) and dst(fr) is the source end station address and the destination end station address respectively. If fr is an encapsulated data frame, it must have been encapsulated by a STAR bridge whose MAC address is src(fr), and dst(fr) is the address of the intended STAR bridge recipient. We let encap(fr, srcbridge, dstbridge) as the encapsulated data frame of a normal data frame fr where srcbridge and dstbridge are respectively the source and destination addresses associated with the encapsulated frame. We use uncap(fr) to represent the normal data frame that an encapsulated data frame fr is carrying in its payload. Pseudocode 7 presents the FD_Search procedure for finding information from the FD. Pseudocode 8 presents the ESL_Search procedure for finding information from the ESL Table. In all the pseudocodes of this section, self is the STAR bridge executing the process, p is the receiving port of the data frame, s is the source end station, t is the destination end station, and pld is the payload portion of a normal data frame. FIG. 19 and FIG. 20 show the flow-charts corresponding to Pseudocode 7 and Pseudocode 8 respectively.

In Pseudocode 8 (ESL_Search_Proc(s, t, pld, p)), when the agent bridge of end station t is not known (Case 8.1). It is an error case and the frame should be dropped. This is an error because DF_STAR_Forwarding_Proc calls ESL_Search_Proc only when self knows that ab(t) is defined (Cas 9.2) or ab(t) is known by some STAR bridge that encapsulates the frame (Case 9.1). When self itself is the agent bridge of t (Case 8.2), it sends the frame to the forwarding port leading to t. In Case 8.3, the agent bridge is another STAR bridge. In this case, the BF Table should give the forwarding port and the next hop information. If not, there is error and the frame is dropped.

Figure 21:
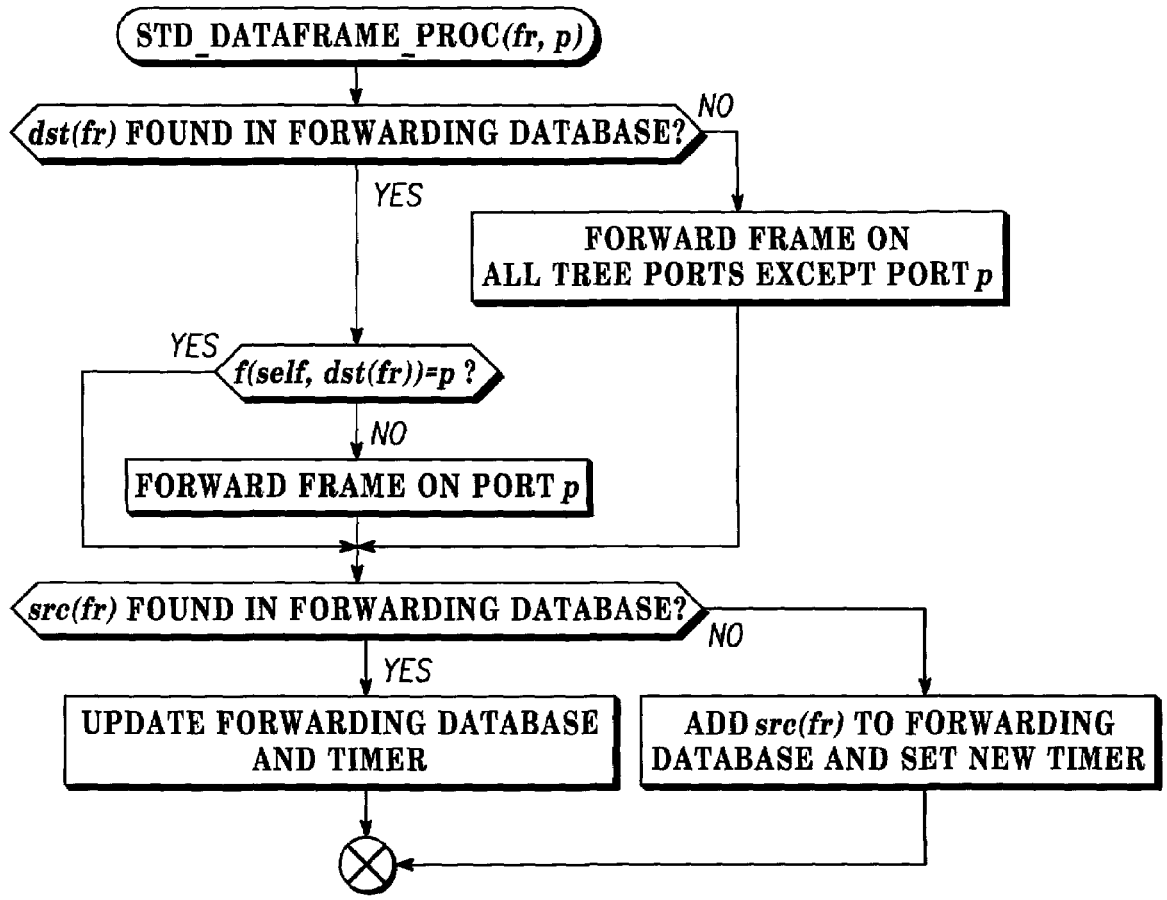
FIG. 21 is a flow chart of the process Std_Data_Frame_Proc.
Figure 22:
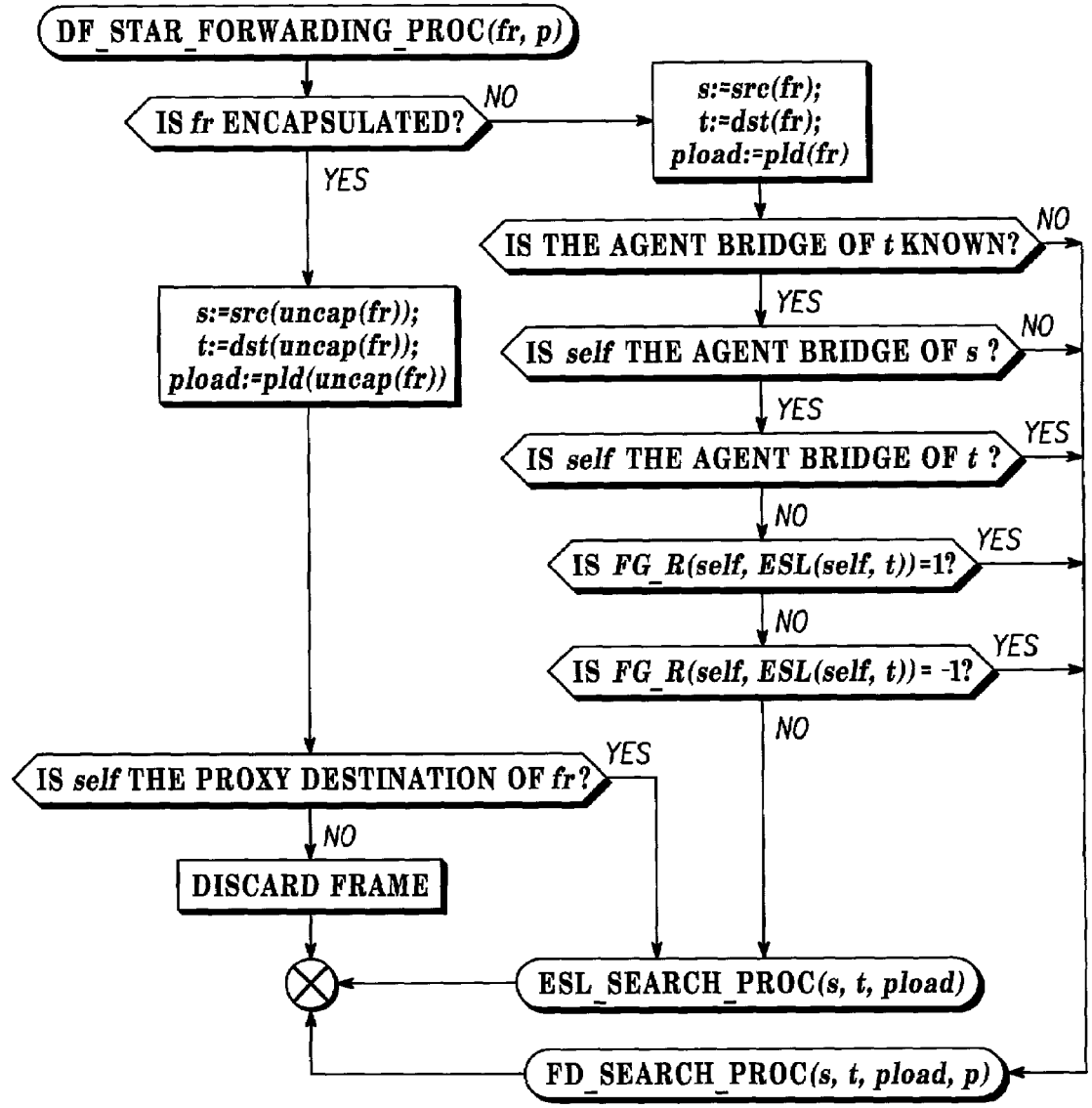
FIG. 22 is a flow chart of the process DF_STAR_Forwarding_Proc.

Pseudocode 9 is a complete new forwarding procedure of bridge self. FIG. 22 shows the flow-chart corresponding to Pseudocode 9. When the data frame is encapsulated, it must be sent from another STAR bridge n', which has the information of ab(t) in its ESL Table and BF Table. Therefore, self should search from its ESL Table to forward the frame. On the other hand, when the data frame is not encapsulated, there are several situations. If ab(t) is unknown (Case 9.2a), of course, self should try to look at the FD. Both Case 9.2b and Case 9.2c are the cases where ab(t) is known. In Case 9.2b, self is the agent bridge of the source end station. In this case, when ab(t) and ab(s) are on the same branch, the normal data frame should not be encapsulated as explained in Section V.C. We don't search the ESL Table in Case 9.2c because of the frame duplication issue discussed in Section V.A. Only a tree path can be used to forward the data frame in this case. FIG. 8 and FIG. 21 show the procedures for processing a data frame in accordance with the STAR Bridge Protocol and the IEEE 802.1D Spanning Tree Bridge Protocol respectively.

---

Pseudocode 7: FD_Search_Proc

PROCEDURE: FD_Search_Proc(s, t, pld, p), also see FIG. 19

```
Begin
        if f(self, t) is not found      /* Case 7.1: End station t is unknown */
             send data frame <s, t, pld> on all tree ports except p
        else if f(self, t) = p          /* Case 7.2: Forwarding port is the coming port */
             drop the frame
        else
             send data frame <s, t, pld> on f(self, t)
        endif
end
```

Pseudocode 8: ESL_Search_Proc

PROCEDURE: ESL_Search_Proc(s, t, pld, p), also see FIG. 20

```
Begin
        if ESL(self, t) is not found       /* Case 8.1: error */
             drop the frame
        Else if ESL(self, t) = self        /* Case 8.2: ab(t) = self */
             Send data frame <s,t,pld> on f(self,t)
        Else                               /* Case 8.3: ab(t) is known and ab(t) ≠ self */
             a := ab(t)
             if F(self, a) is not found or /* Case 8.3a: error */
                next (self, a) is not found
                   drop the frame
```

```
        else                    /* Case 8.3b: encapsulation necessary */
            send data frame encap(<s, t, pld>, addr(self), addr(next(self, a)))
                on F(self a)
            endif
        endif
end
                    Pseudocode 9: DF_STAR_Forwarding_Proc PROCEDURE: DF_STAR_Forwarding_Proc(fr, p), also see FIG. 22

Begin
    If fr is encapsulated         /* Case 9.1: fr is an encapsulated frame */
        s := src(uncap(fr))
        t := dst(uncap(fr))
        pload := pld(uncap(fr))
        if dst(fr) ≠ addr(self)    /* self is not the proxy destination */
            drop the frame
        else
            ESL_Search_Proc(s, t, pload)
        endif
    else                          /* Case 9.2: fr is not encapsulated */
        s := src(fr)
        t := dst(fr)
        pload := pld(fr)
        if ESL(self, t) is not found    /* Case 9.2a: ab(t) is unknown */
            FD_Search_Proc(s, t, pload, p)
        Else if ESL(self, s) = self     /* Case 9.2b: ab(s) = self */
            If ESL(self, t) = self      /* ab(s) = ab(t) */
                FD_Search_Proc(s, t, pload, p)
            If FG_R(self, ESL(self t)) = −1  /* ab(t) is an ancestor of ab(s) */
                FD_Search_Proc(s, t, pload, p)
            Else if FG_R                /* ab(t) is an descendant of ab(s) */
            (self,ESL(self, t)) = −1
                FD_Search_Proc(s, t, pload, p
            else                        /* ab(t) and ab(s) are on different branches */
                ESL_Search_Proc(s, t, pload)
        Else                            /* Case 9.2c: ab(s) is unknown or ab(s) ≠ self */
            FD_Search_Proc(s, t, pload, p)
        endif
    endif
end
```

VI. Update

In the IEEE 802.1D standard, the root bridge sends a BPDU message periodically to update the spanning tree. When a bridge detects a topological change, it sends a Topology Change Notification BPDU frame to inform other bridges to recompute the spanning tree. End station information is updated by a timeout mechanism. Each entry in the FD is assigned a timer and the information is forgotten when the timer expires.

The STAR Bridge Protocol keeps topological information in the BF Table, which is built upon the spanning tree and eligible crosslinks. Therefore, if either the tree changes or any crosslink changes, the BF Table must be recomputed. The procedure for detecting any change of the spanning tree is available in the above-mentioned standard. The BF Table is recomputed after the spanning tree becomes stable again. The mechanism of detecting crosslink failures is described in Section I.F. A STAR bridge transits back to the Tree Learned state when a crosslink fails. In the mean time, the STAR bridge executes the standard forwarding process and the standard learning process instead of the new ones to forward data frames.

In the STAR Bridge Protocol, the information needed for reaching end stations is kept in the ESL Table and the FD. They both time out in the same way as the FD in the old bridges do. This is necessary because no bridge can detect the relocation of an end station. Since bridge addresses do not change frequently, the BA Table does not need to be timed out.

VII. Performance

In this section, we analyze the storage, message complexity, and path length of the STAR Bridge Protocol.

VII.A Storage

Each old bridge keeps only one table for forwarding, which is the FD. One entry is necessary for each known end station. Therefore, the space required is $O(|M|)$, where M is the set of all end stations in the extended LAN. In addition to an FD, there are three new tables in each STAR bridge: BF Table, ESL Table, and BA Table. Table 5 is a summary of these tables in STAR bridge n.

TABLE 5

Storage Requirements in STAR Bridges

| Name | Content | Space Required |
|---|---|---|
| BF Table | $<n', F(n, n'), \text{next}(n, n'), FG\_R(n, n')>$, $n' \in B\backslash\{n\}, F(n, n') \in P(x), \text{next}(n, n') \in B\backslash\{n\}$ | $O(|B|)$ |
| ESL Table | $<s, ab(s)>, s \in M, ab(s) \in B$ | $O(|M|)$ |
| BA Table | $<n', \text{addr}(n')>, n' \in B\backslash\{n\}\backslash N_B(n)$ | $O(|B|)$ |
| FD | $<s, f(n, s)>, s \in M, f(n, s) \in P_T(x)$ | $O(|M|)$ |

After the STAR learning process has been executed for some time and old entries in the FD have been timed out, an end station s appears in both the ESL Table and the FD of STAR bridge n only if ab(s)=n. Therefore, the total memory needed for the ESL Table and the FD in STAR bridges together would be about the same as in the old bridges. We do need extra space for the BF Table and the BA Table. However, as the number of entries of both tables is at most |B| which is far less than |M|, we can conclude that the storage requirement in a STAR bridge is comparable to that in an old bridge.

VII.B Message Complexity

In the IEEE 802.1D standard, BPDU frames are sent periodically to build and maintain a spanning tree. In the STAR Bridge Protocol, SBPDU frames are introduced and they are described in Section I.D. Hello SBPDUs are sent on eligible crosslinks only and a Hello SBPDU frame will not propagate beyond the crosslink that it is sent on. Therefore, Hello SBPDUs do not put extra message overhead on tree links. Distance Vector Change Notification SBPDUs are sent only when distance vectors have to be recomputed and they are sent over the spanning tree. As a result, under stable configuration, there will normally be no Distance Vector Change Notification SBPDUs generated. Table 6 summarizes the format of Distance Vector Computation SBPDUs and Station Location Announcement SBPDUs. The path finding process generates Distance Vector Computation SBPDUs and the STAR learning process generates Station Location Announcement SBPDUs.

For each Distance Vector Computation SBPDU frame generated by the path finding process, there is at most one recipient on each port. Obviously, there should be more DVRecord frames than other Distance Vector Computation SBPDU frames in this process. The number of DVRecord frames needed for each pair of STAR bridges depends on the length of the enhanced forwarding path between them. The path length is bounded by the diameter of the tree. The number of messages generated by the spanning tree is related to the diameter of the tree too. Therefore, we can conclude that the number of messages generated by the path finding process is about |B| times the number of the messages needed in building the spanning tree. The path finding process will not generate any DVRecord frame after building the BF Table. Nevertheless, the root bridge will keep on generating BPDU messages periodically after the spanning tree has been built. Therefore, for a stable bridged LAN, the extra number of messages generated by the path finding process is negligible.

TABLE 6

Summary of SBPDU Frames used in the STAR processes

| SBPDU Frame | Recipients responsible for processing the frame | Number of copies for each recipient |
| --- | --- | --- |
| DVMyInfo | $n' \in N'_B(n)$ | 1 |
| DVOurInfo | $n' \in N'_B(n)$ s.t. nca(n, n') = n | 1 |
| DVInform | $n' \in N'_B(n)$ s.t. nca(n, n') = n | \|{k\|k $\in$ {N'$_B$(n') s.t. k and n' are on different branches}\| |

TABLE 6-continued

Summary of SBPDU Frames used in the STAR processes

| SBPDU Frame | Recipients responsible for processing the frame | Number of copies for each recipient |
| --- | --- | --- |
| | $n' \in N'_B(n)$ s.t. nca(n, n') ≠ n | 1 when the accurate distance is calculated by n but not n'; 0 otherwise |
| DVRecord | $n' \in N'_B(n) \cup N_B(n)$ | At most \|B\| for each k $\in$ B\{n, n'} |
| StationLoc | $n' \in B\setminus\{n\}$ | \|{m\|m $\in$ M s.t. ab(m) = n}\| |

Location information is necessary in all algorithms in Section 3 that are applicable for any additive metric. In those algorithms, every bridge has to know the location of all end stations. In the STAR Bridge Protocol, a STAR bridge keeps only the location of end station s provided ab(s) is defined. Therefore, the location messages generated by the STAR Bridge Protocol are less than those generated by the algorithms in the prior art.

VII.C Path Length

In this section, we would like to show that the length of a STAR forwarding path is always less than or equal to the corresponding tree path. In the following discussion, we denote the length of the STAR forwarding path between two bridges x and y as len(x, y). In all figures referring to this section, a black node represents a STAR bridge, a white node represents an old bridge, and a dot-dash line represents a tree path. We first establish the following lemmas.

Lemma 1:

When a STAR bridge n receives a normal data frame originated by an end station s, the STAR bridge may encapsulate the frame only if n=ab(s).

Proof of Lemma 1:

We observe that encapsulation is executed only in the ESL_Search_Proc procedure (Pseudocode 8) and the DF_STAR_Forwarding_Proc procedure (Pseudocode 9) in which the ESL_Search_Proc procedure is invoked. In DF_STAR_Forwarding_Proc procedure, when n receives a normal data frame, the ESL_Search_Proc procedure is invoked by n only when n=ab(s) (Case 9.2b). Note that if ab(s) is not defined, n can never be ab(s).

Lemma 2:

A normal data frame originated by an end station s will always be forwarded over a tree path if the frame is not encapsulated by ab(s).

Proof of Lemma 2:

According to Case 8.3b in the ESL_Search_Proc procedure, the normal data frame is never forwarded over a crosslink, unless it is encapsulated. By Lemma 1, if the normal data frame is not encapsulated by ab(s), it will remain as a normal data frame for the rest of its forwarding journey. According to Case 9.2a and Case 9.2c of the DF_STAR_Forwarding_Proc procedure, having received the normal data frame, a STAR bridge n that is not ab(s) may forward the frame only to tree neighbors. Having received the normal data frame, an old bridge may forward the frame only to tree neighbors. Therefore, the normal data frame will be forwarded over a tree path if the frame is not encapsulated by ab(s).

Lemma 3:

If a frame is forwarded from an end station s to another end station t over an enhanced forwarding path, the path must traverse at least one crosslink, and the frame must be encapsulated by ab(s), which is necessarily defined.

Proof of Lemma 3:

If s and t are on the same branch, then the tree path from s to t is necessarily a shortest path. Given that s and t are on different branches, the forwarding may traverse two or more different branches. In the first case, the forwarding path must traverse a crosslink, or it would not be an enhanced forwarding path. In the second case, it must traverse at least one crosslink because the forwarding path cannot be a normal tree path. According to Case 8.3b in the ESL_Search_Proc procedure, the frame will be encapsulated when it is forwarded over any crosslink. By Lemma 2, the frame must be encapsulated by ab(s).

Lemma 4:

If a STAR forwarding path, along which a frame is sent from an end station s to another end station t, is an enhanced forwarding path, then ab(s) must be defined and is the first STAR bridge on the enhanced forwarding path.

Proof of Lemma 4:

By Lemma 3, the frame must be encapsulated by ab(s), which is necessarily defined. Since ab(s) is by definition the first STAR bridge on the root path of db(s). If ab(s)=db(s), then the proof is complete. Otherwise, db(s) is an old bridge, and will send a copy of the frame along the root path of db(s) regardless of its knowledge of the end station t. This copy of the frame will be received ab(s), which will encapsulate the frame so that it will be forwarded over the enhanced forwarding path. Duplicate copies of the frame will be dropped in accordance with the protocol.

Lemma 5:

If a STAR forwarding path, along which a frame is sent from an end station s to another end station t, is an enhanced forwarding path, then ab(t) must be defined and is the last STAR bridge on the enhanced forwarding path.

Proof of Lemma 5:

By Lemma 3, the forwarding path must traverse at least one crosslink. According to Case 8.3b in the ESL_Search_Proc procedure, the frame will be encapsulated when it is forwarded over each crosslink. ab(t) must be defined because, according to Case 9.2a of DF_STAR_Forwarding_Proc procedure, a frame will not be encapsulated otherwise. If ab(t)=db(t), the proof is complete. Otherwise, ab(t) must be an ancestor of db(t) by definition, and db(t) must receive the frame without encapsulation. It suffices to show that ab(t) is on the enhanced forwarding path and all intermediate STAR bridges on the enhanced forwarding path, except ab(t), will forward the frame with encapsulation. ab(t) is on the enhanced forwarding path because, according to Case 8.3b of the ESL_Search_Proc procedure, each intermediate STAR bridge forwards the encapsulated frame through its forwarding port leading to ab(t). According to Case 8.2 and Case 8.3 in the ESL_Search_Proc procedure, a STAR bridge will forward the frame without encapsulation only if it is ab(t).

Lemma 6:

When ab(s) and ab(t) are both defined, and they are on different branches of the spanning tree, len(db(s), db(t))<$d_T$(db(s), db(t)).

Figure 23A:
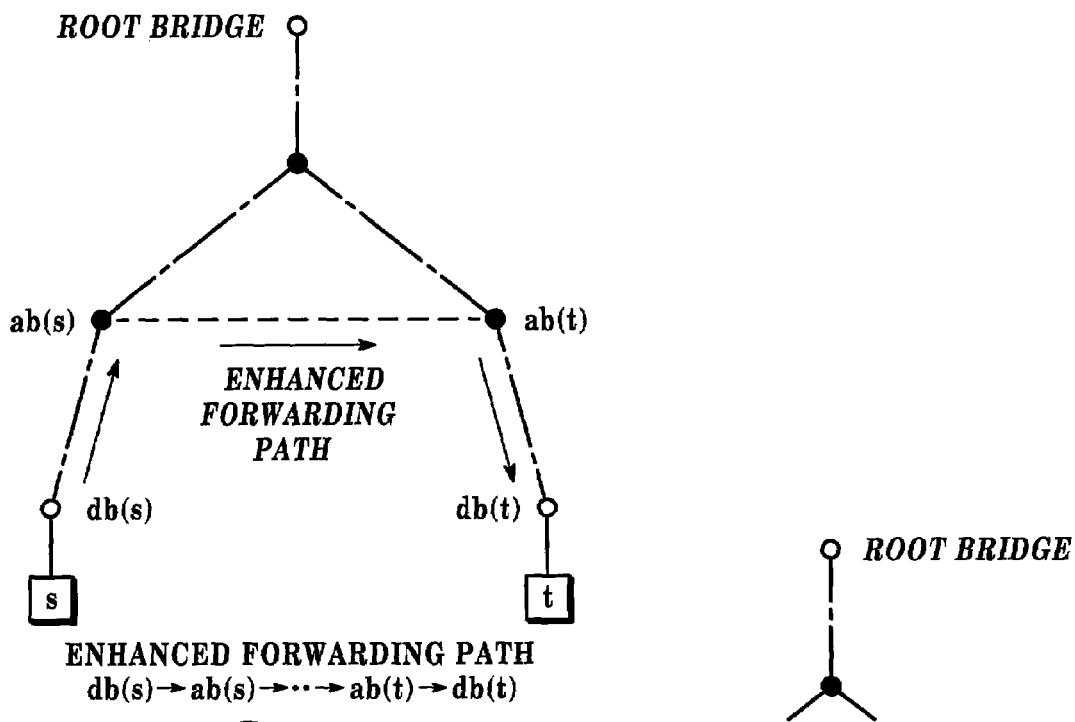
FIGS. 23a–23c are diagrams useful in explaining the possible paths between end stations, showing tree paths and enhanced forwarding paths.
Figure 23B:
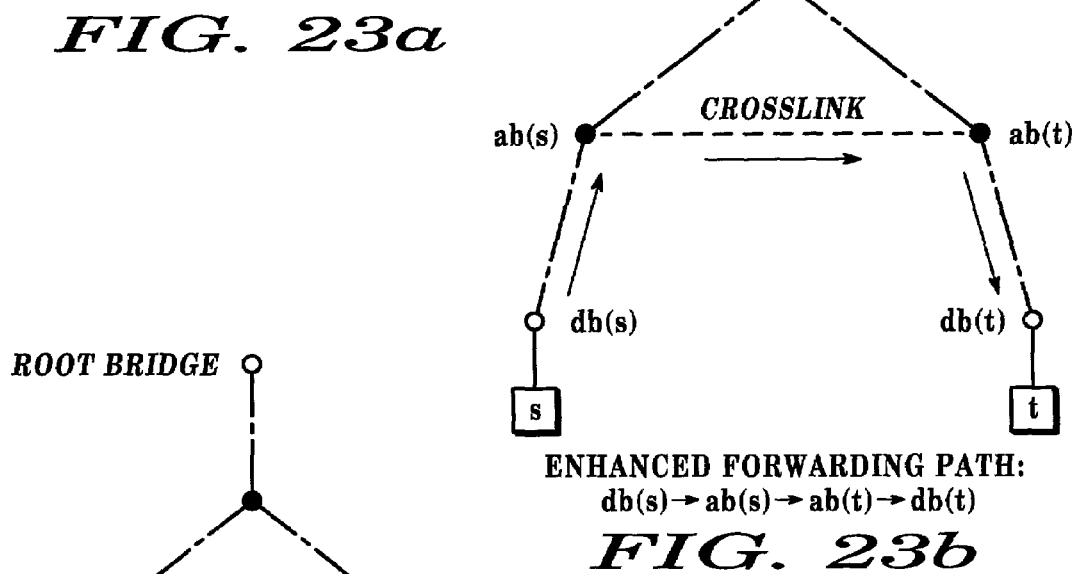
Figure 23C:
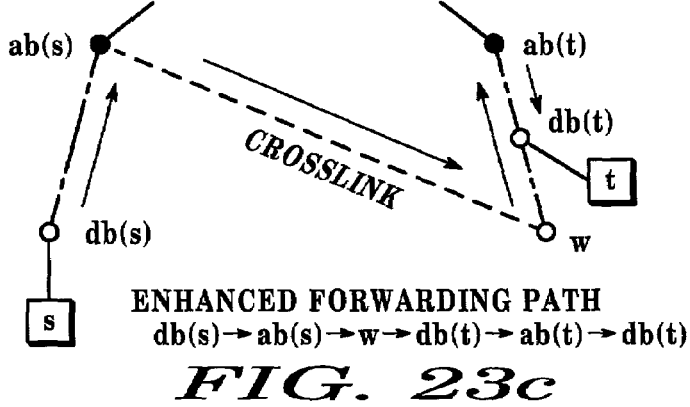
Figure 24A:
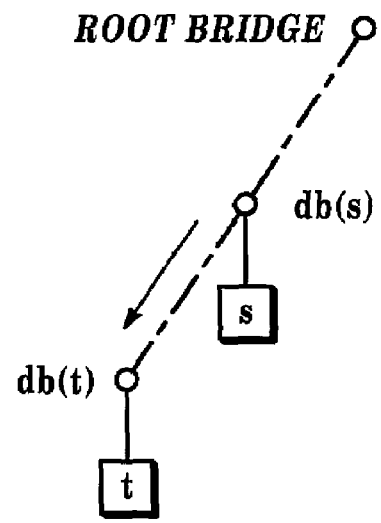
FIGS. 24a–24d are diagrams useful in explaining examples of forwarding paths when at least one of the agent bridges of the end stations is not defined.
Figure 24B:
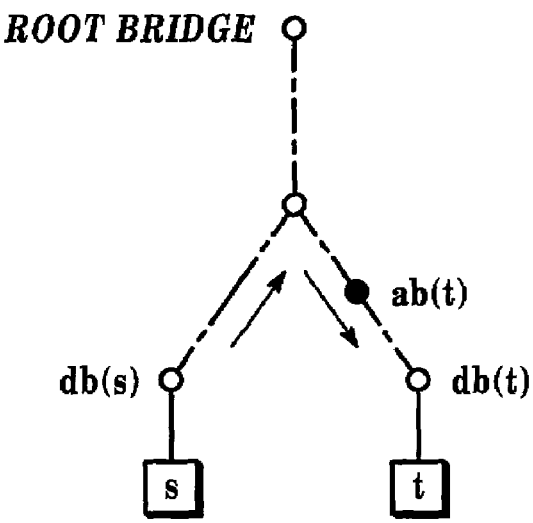
Figure 24C:
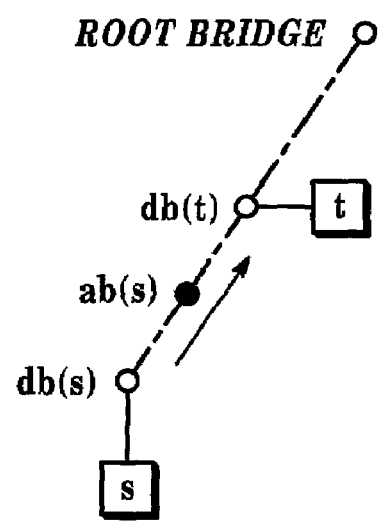
Figure 24D:
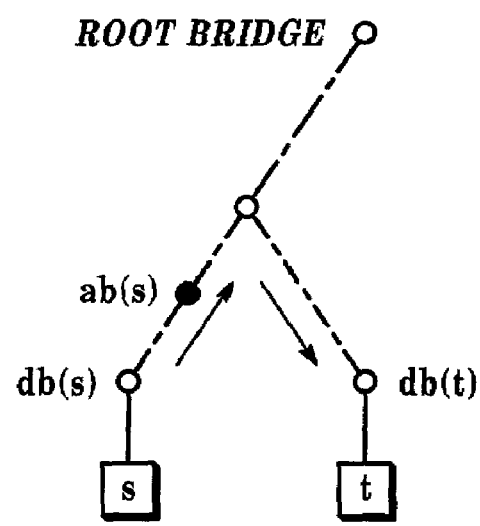

Proof of Lemma 6:

FIGS. 23a–23c respectively show various exemplary scenarios for this lemma. Since ab(s) and ab(t) are on different branches, s and t must be on different branches. If the forwarding path from db(s) to db(t) is a tree path (FIG. 23a), then the proof is complete. Otherwise, the forwarding path is an enhanced forwarding path. By Lemma 4, ab(s) is the first STAR bridge on the enhanced forwarding path. By Lemma 5, ab(t) is the last STAR bridge on the enhanced forwarding path. Therefore, the enhanced forwarding path consists of three disjoint segments. The first segment, which is a tree path from db(s) to ab(s), has a path length $d_T$(db(s), ab(s)). The second segment, which is an enhanced forwarding path from ab(s) to ab(t), has a path length d(ab(s), ab(t)). The third segment, which is a tree path from ab(t) to db(t), has a path length $d_T$(ab(t), db(t)). Therefore, len(db(s), db(t)), the length of the enhanced forwarding path from db(s) to db(t), satisfies the following inequality.

$$len(db(s), db(t)) = d_T(db(s), ab(s)) + d(ab(s), ab(t)) + d_T(ab(t), db(t))$$
$$\leq d_T(db(s), ab(s)) + d_T(ab(s), ab(t)) + d_T(ab(t), db(t))$$
$$= d_T(db(s), db(t))$$

Lemma 7:

A STAR forwarding path for a frame sent by an end station s to another end station t is a tree path if at least one of ab(s) and ab(t) is not defined.

Proof of Lemma 7:

FIGS. 24a–24d respectively show various exemplary scenarios for this lemma. By Lemma 2, if ab(s) is not defined, the STAR forwarding path must be a tree path because the frame will never be encapsulated. According to Case 9.2a of DF_STAR_Forwarding_Proc procedure, a frame will not be encapsulated unless ab(t) is defined.

Lemma 8:

When ab(s) and ab(t) are both defined, and ab(s)=ab(t), then len(db(s), db(t))≤$d_T$(db(s), db(t)).

Figure 25A:
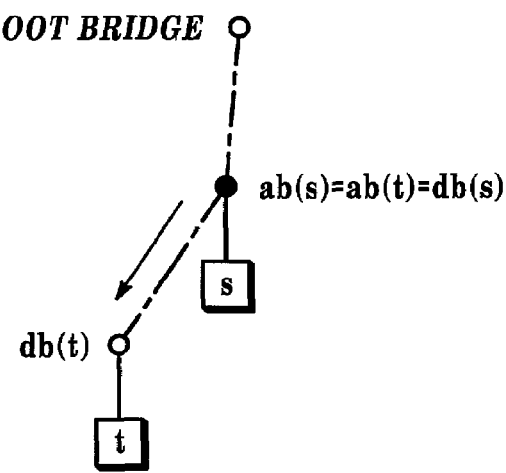
FIGS. 25a–25c are diagrams useful in explaining examples of selection of tree paths when the agent bridges of both end stations are defined.
Figure 25B:
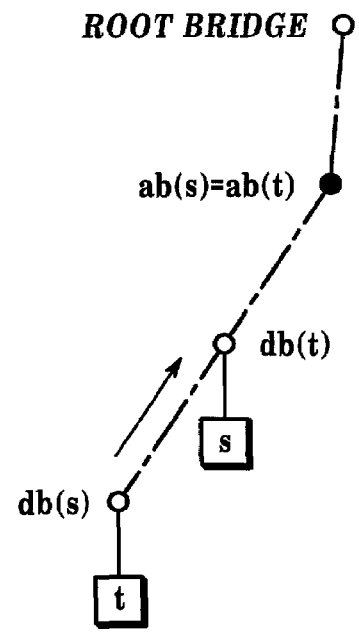
Figure 25C:
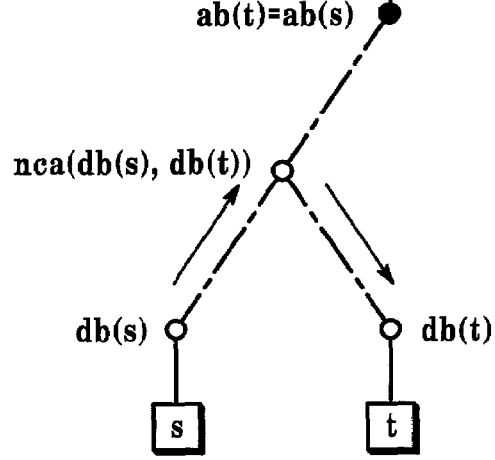

Proof of Lemma 8:

FIGS. 25a–25c show various exemplary scenarios for this lemma. When ab(s)=ab(t), there are two cases: ab(s)=db(s) and ab(s) 0 db(s). In the first case, according to Case 8.2 of the ESL_Search_Proc procedure, ab(s) will send the frame according to the tree path, and the proof is complete. In the second case, if db(t) is an ancestor of db(s), when the normal data frame travels upstream from db(s), it will reach db(t) before ab(s) and so ab(s) won't receive that. In the second case, if db(t) is a descendant of db(s), by Lemma 8, the STAR forwarding path must be a tree path, and the proof is complete.

Lemma 9:

When ab(s) and ab(t) are both defined, ab(s)≠ab(t), and ab(s) is an ancestor of ab(t), then len(db(s), db(t))≤$d_T$(db(s), db(t)).

Figure 26:
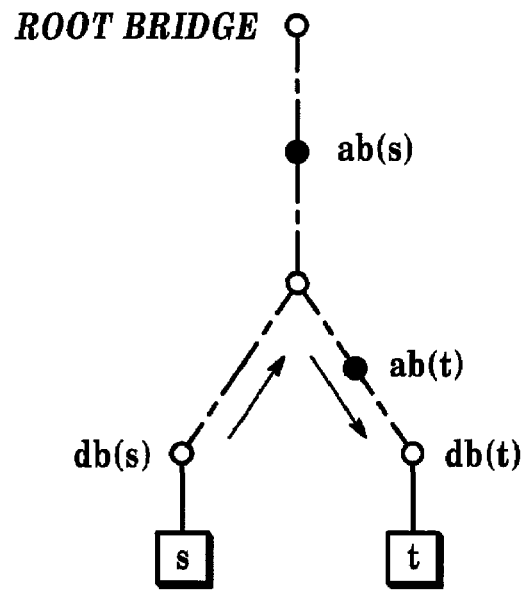
FIG. 26 is a diagram useful in explaining the selection of a tree path when the agent bridges of the end stations are defined and are different.

Proof of Lemma 9:

FIG. 26 shows an exemplary scenario for this lemma. When ab(s) is an ancestor of ab(t), there are two cases: ab(s)=db(s) and ab(s)≠db(s). In the first case, ab(s) may encapsulate the normal data frame and send it downstream along the tree path. When ab(t) receives an encapsulated data frame, it will strip off the header and trailer, and send the normal data frame according to the information in the FD. Therefore, the STAR forwarding path between db(s) and db(t) is a tree path. The proof is complete. When ab(s)≠db(s), ab(s) must be an ancestor of db(s) and db(s) must be an ancestor of db(t).

Lemma 10:

When ab(s) and ab(t) are both defined, ab(s)≠ab(t), and ab(s) is a descendant of ab(t), then len(db(s), db(t))≦$d_T$(db(s), db(t)).

Figure 27:
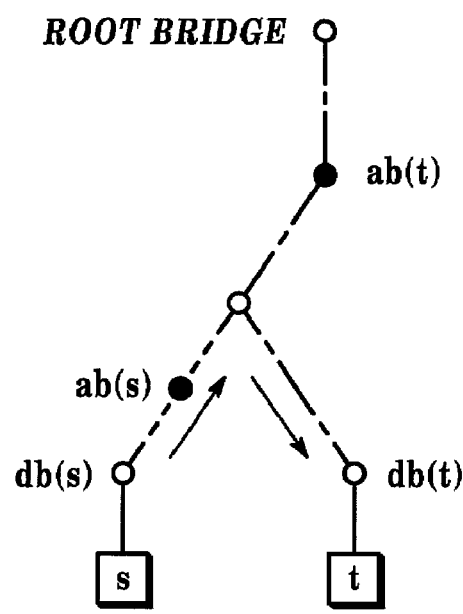
FIG. 27 is a diagram useful in explaining the selection of a tree path when the agent bridges of the end stations are defined, are not the same and one is the ancestor of the other.

Proof of Lemma 10:

FIG. 27 shows an exemplary scenario for this lemma. We have discussed the issue of the scenario in which ab(t) is an ancestor of ab(s) in Section V.D. When ab(s) finds out that ab(t) is an ancestor, it sends out the normal data frame on its root port. Since only ab(s) is allowed to encapsulate the normal data frame, all STAR bridges on the tree path between ab(s) and ab(t) will send the normal data frame on tree ports only. Then, the normal data frame will reach db(t) along the tree path without any redundant traversal and the proof is complete. All duplicate frames sent over the spanning tree will eventually be dropped.

We now present a theorem on the path length of the STAR bridge protocol.

Theorem 1:

A STAR forwarding path for a frame sent by an end station s to another end station t leads from db(s) to db(t), and has a path length len(db(s), db(t)) that satisfies the following inequality.

$$len(db(s), db(t)) \leq d_T(db(s), db(t))$$

Proof of Theorem 1:

We first observe that any STAR forwarding path is either a tree path or an enhanced forwarding path. If it is a tree path, the proof is complete. Otherwise, we will show that the inequality still holds.

We divide all situations into the following scenarios:
1. ab(s) is not defined
2. ab(s) is defined
   2.1. ab(t) is not defined
   2.2. ab(t) is defined
      2.2.1. ab(s) and ab(t) are on different branches
      2.2.2. ab(s) and ab(t) are on the same branch By Lemma 7, the STAR forwarding path is always a tree path except for the cases in scenario 2.2. By Lemma 6, the inequality holds for scenario 2.2.1. By Lemma 9 through Lemma 11, the inequality holds for scenario 2.2.2.

VIII. Conclusion

We have disclosed a new STAR Bridge Protocol that is backward compatible with the standard IEEE 802.1D Spanning Tree Bridge Protocol. The protocol described herein offers provably shorter alternate paths for frame forwarding whenever such paths are found, and uses tree paths otherwise. Incidentally, the standard protocol places a restriction on the maximum bridge diameter, which is the maximum number of bridges between any two points of attachments of end stations. The IEEE 802.1D specification recommends a maximum bridge diameter of 7. Given a set of LANs and bridges, there may not exist any single RST that could be built by the standard protocol to satisfy such a restriction. The STAR Bridge Protocol, on the other hand, may still satisfy the restriction because enhanced forwarding paths may reduce the bridge diameter. With the use of enhanced forwarding paths, frames that would have passed through the root bridge in the standard spanning tree may be diverted over alternate paths such that the load at the root bridge is likely to be alleviated.

Being backward compatible with the IEEE 802.1D standard, the proposed bridge protocol offers a smooth migration path to QoS-based bridging. Eventually, all old bridges will be phased out or replaced by STAR bridges. When there is no old bridge in the bridged network, distance vector routing can be used to find all-pair shortest paths. Since distance vectors are always forwarded one hop away, there will be no distant STAR neighbor when all bridges are STAR. Note that the IEEE 802.1D spanning tree is still needed as explained below.

In the path finding process, Distance Vector Estimation does not have to estimate tree path distance anymore. As a result, the first phase is not necessary. There will be no DVMyInfo, DVOurInfo, or DVInform frames. It follows that the DVMyInfo_Proc, DVOurInfo_Proc, and DVInform_Proc procedures may be disabled or removed by the STAR bridges. Since the next hop bridge is always a direct neighbor and all distances are accurate, need for the fields next(n, n'), FG_A(n, n'), FG_T(n, n'), and FG_R(n, n') in DVT(n, n') is eliminated. The Distance Vector Enhancement procedure will be exactly the same as the conventional distance vector update procedure since all the distances are accurate.

Mapping between end stations and agent bridges is still needed. It follows that there is still need for the ESL Table. Since all bridges attached to a LAN are STAR bridges, the bridge that has the smallest Bridge ID can be selected to be the agent bridge for the stations. Note that the agent bridge of each end station is defined and known by all bridges for all end stations. Therefore, when the destination end station for a data frame is known, the data frame can always travel on a STAR forwarding path. If the destination end station for a data frame is unknown, there is need to ensure that the destination end station receives no duplicate of the data frame. In this respect, the IEEE 802.1D spanning tree is useful for loop-free flooding of the data frame throughout the bridged LAN. Data frames still have to be encapsulated in order to distinguish data frames just sent out by end stations with data frames that are forwarded by another bridge.

The STAR bridges have to keep topology information by means of distance vectors even after complete migration. The size of a distance vector is proportional to the number of bridges. If the bridged LAN is large and consists of a lot of bridges, keeping distance vectors takes too much space. As a result, it is desirable to have another protocol that requires less topology information but is able to enhance tree paths.

APPENDIX

List of Acronyms

| | |
|---|---|
| BA | Bridge Address |
| BF | Bridge Forwarding |
| BPDU | Bridge Protocol Data Unit |
| CM | Cable Modem |
| CMTS | Cable Modem Termination System |
| DF | Data Frame |
| DHCP | Dynamic Host Configuration Protocol |
| DLS | Distributed Load Sharing |
| DOCSIS | Data-Over-Cable Service Interface Specifications |
| DV | Distance Vector |
| DVC | Distance Vector Computation |
| DVCN | Distance Vector Change Notification |
| ESL | End Station Location |
| FD | Forwarding Database |
| GDLS | Generalized Distributed Load Sharing |
| ID | Identifier |
| IP | Internet Protocol |
| LAN | Local Area Network |
| LLC | Logical Link Control |
| MAC | Medium Access Control |
| QoS | Quality of Service |
| RST | Rooted Spanning Tree |
| SBPDU | STAR Bridge Protocol Data Unit |
| SLA | Station Location Announcement |
| STAR | Spanning Tree Alternate Routing |

TABLE A

Notation

| Notation | Definition | Remarks |
|---|---|---|
| V | Set of bridges representing all bridges | |
| B | Set of bridges representing STAR bridges | $B \subseteq V$ |
| N(x) | Set of all direct neighbors of bridge x | $N(x) \subseteq V \setminus \{x\}$ |
| $N_B(x)$ | Set of direct STAR neighbors of x | $N_B(x) \subseteq N(x)$, $N_B(x) \subseteq B$ |
| $N'_B(x)$ | Set of distant STAR neighbors of x | $N'_B(x) \subseteq B$ |
| P(x) | Set of all ports of bridge x | |
| $P_T(x)$ | Set of tree ports of bridge x | $P_T(x) \subseteq P(x)$ |
| $p_r(x)$ | Root port of bridge x | |
| p(x, y) | Port of bridge x leading to neighbor bridge y | $p(x, y) \subseteq P(x)$. |
| c(x, y) | Weight of link between bridge x and bridge y | $c(x, y) = 0$ if $x = y$ <br> $c(x, y) > 0$ if $x \neq y$ |
| $d_r(x)$ | Root path distance of bridge x for x for $x \in V \setminus \{r\}$ | Root bridge r is given |
| Treepath(x, y) | Tree path from x to y | $x \in V, y \in V$ |
| $d_T(x, y)$ | Tree path distance between bridge x and bridge y | $d_T(x, y) = 0$ if $x = y$ <br> $d_T(x, y) > 0$ if $x \neq y$ |
| d(x, y) | Current estimated distance from x to y, for $x \in B$ and $y \in B \setminus \{x\}$ | $d(x, y) = 0$ if $x = y$ <br> $d(x, y) > 0$ if $x \neq y$ |
| F(x, y) | Forwarding port from bridge x to bridge y for $x \in B$ and $y \in B \setminus \{x\}$ | $F(x, y) \in P(x)$ |
| f(x, s) | Forwarding port from bridge x to end station s for $x \in V$ and $s \in M$ | $f(x, s) \in P(x)$ |
| M | Set of all end stations | |
| Ab(s) | Agent bridge of end station s | $s \in M$, $ab(s) \in B$ |
| Db(s) | Designated bridge of end station s | $db(s) \in V$ |
| S(x) | Set of end stations in the FD of x, $x \in V$ | $S(x) \subseteq M$ |
| H(x) | Set of end stations in ESL Table of x, $x \in B$ | $H(x) \subseteq M$ |
| Nca(x, y) | Nearest common ancestor of bridge x and bridge y | $nca(x, y) \in V$ |
| Path(x, y) | The forwarding path, from x to y, used by the proposed protocol | $x \in V, y \in V$ |
| len(x, y) | Length of path(x, y) | $len(x, y) = 0$ if $x = y$ <br> $len(x, y) > 0$ if $x \neq y$ |
| Dsan(n) | Distant STAR ancestor neighbor of bridge $n \in B$ | $dsan(n) \in B$ |
| Dsanc(n) | Child of distant STAR ancestor neighbor of bridge $n \in B$ | $dsanc(n) \in V$ |
| Dcc(n) | Doubly counted cost between $dsan(n) \in B$ and $dsanc(n) \in V$ | $dcc(n) > 0$ |
| cb(k, n) | Child of bridge $k \in B$ on a tree path leading from k to $n \in B$ | $cb(k, n) \in V$ |

While the principles of the invention have been described above in connection with specific apparatus, it is to be clearly understood that this description is made only by way of example and not as a limitation on the scope of the invention.

What is claimed is:

1. Apparatus for determining paths for forwarding frames among end stations in a system of interconnected local area networks, comprised of:

first and second groups of frame forwarding devices known as bridges, which are used to interconnect local area networks;

a spanning tree cooperating with said groups of bridges for providing loop-free frame forwarding;

said first and second groups of bridges having means for determining tree paths for loop-free frame forwarding to an end station;

said second group of bridges having further means cooperating with said first group of bridges to determine an alternate path for loop-free forwarding of a frame to the end station, which alternate path is shorter than any tree path to said end station wherein bridges of said second group are respectively arranged upstream and downstream of an intervening bridge of said first group in a common tree path and said bridges of said second group including means for encapsulating a received enabling transfer through the intervening bridge, frame with a source address and a destination address wherein (a) wherein a cross-link incident on a said downstream bridge is a segment on said alternate path, said transfer through the intervening bridge is in the downstream direction, and (b) wherein a cross-link incident on said upstream bridge is a segment on said alternate path, said transfer through the intervening bridge is in the upstream direction.

2. The apparatus of claim 1 wherein said second group of bridges are backward
compatible with said first group of bridges, wherein the operation of said first group of bridges is unaltered by the presence of said second group of bridges, and
said second group of bridges inter-operate with said first group of bridges when at least one bridge of the latter group is present in the system, and
said second group of bridges can perform their functions in the absence of said first group of bridges in order to operate.

3. The apparatus of claim 1 wherein said first group of bridges include means for performing a spanning tree bridge protocol (STBP) to determine a loop-free tree path for forwarding a frame to an end station; and
said second group of bridges including means for performing a spanning tree alternate routing bridge protocol (STAR BP) for determining said alternate path.

4. The apparatus of claim 3 wherein said means for performing said spanning tree alternate routing bridge protocol includes means for performing said spanning tree bridge protocol.

5. The apparatus of claim 1 wherein said end stations are distributed among said local area networks that are interconnected; and
said first and second groups of bridges selectively forward frames from end stations in one of said local area networks to end stations in another one of said local area networks.

6. The apparatus of claim 1 wherein each bridge of the second group of bridges further comprises means for selecting a tree path when said means for determining an alternate path fails to identify an alternate path.

7. The apparatus of claim 1 wherein selected ones of bridges of said second group are arranged along different tree paths and are joined by cross-links;
said means for determining said alternate paths including means for determining if a path including one of said cross-links provides a path shorter than a tree path.

8. The apparatus of claim 7 wherein said means for determining alternate paths include means for ignoring cross-links whose end terminals are not connected to bridges of said second group.

9. The apparatus of claim 7 wherein said means for determining alternate paths includes means for ignoring cross-links whose end terminals are joined to bridges lying along the same tree path.

10. The apparatus of claim 1 wherein bridges of said second group are respectively arranged upstream and downstream of an intervening bridge of said first group in a common tree path and said upstream bridge of said second group including means for encapsulating a received frame with a source address and a destination address enabling transfer through the intervening bridge of said first group to the downstream bridge of said second group, wherein said transfer through the intervening bridge of the first group is in a downstream direction;
said intervening bridge including means for directing the encapsulated frame to said downstream bridge of said first group responsive to said destination address in accordance with normal frame forwarding over a tree path; and
said downstream bridge including means for stripping the encapsulated portions of an encapsulated frame and for forwarding said stripped encapsulated frame over a remaining portion of the forwarding path to an end station identified by a destination address incorporated as part of the unencapsulated frame.

11. The apparatus of claim 1 wherein bridges of said second group are respectively arranged upstream and downstream of an intervening bridge of said first group in a common tree path and said downstream bridge of said second group including means for encapsulating a received frame with a source address and a destination address enabling transfer through the intervening bridge of said first group to the upstream bridge of said second group, wherein said transfer through the intervening bridge of the first group is in an upstream direction;
said intervening bridge including means for directing the encapsulated frame to said upstream bridge of said first group responsive to said destination address in accordance with normal frame forwarding over a tree path; and
said upstream bridge including means for stripping the encapsulated portions of an encapsulated frame and for forwarding said stripped encapsulated frame over a remaining portion of the forwarding path to an end station identified by a destination address incorporated as part of the unencapsulated frame.

12. The apparatus of claim 1 wherein bridges of said second group include means for encapsulating a frame with at least a destination address of a bridge of said second group coupled to a bridge of said first group through a tree path;
said bridges of said first group including means responsive to said destination address for forwarding the encapsulated frame to the bridge identified by said destination address;
said bridges of said second group having means responsive to receipt of said encapsulated frame for stripping the frame of said encapsulation and forwarding the stripped frame to an end station identified by a destination address incorporated as part of said stripped frame.

13. The apparatus of claim 1 wherein each bridge of said first and second groups include means for assigning a weighted metric to each port of the bridge;
means for exchanging said weighted metrics with other bridges in the system;
means for electing a root bridge responsive to the exchanged information;
means for determining a distance between each bridge and said root bridge;
means for building a unique spanning tree rooted at the root bridge in a distributed manner;
means for learning and remembering which port to forward a frame over said spanning tree to a given end station; and
means for storing said data.

14. The apparatus of claim 13 wherein each bridge of said second group of bridges is further provided with means for conveying to other bridges of said second group information representing topology known to the conveying bridge;
means for conveying to other bridges of the second group information identifying bridges of the second group which are a source for frames and a destination for frames;
means for conveying to other bridges of the second group topology information known to bridges of the second group other than the conveying bridge; and means for storing information received from other bridges of said second group for determining, if possible, an alternate path shorter than a corresponding tree path.

15. The apparatus of claim 1 wherein each bridge of said second group is further provided with means for determining if another bridge of said second group is directly connected thereto by a cross-link which is a link that is not used to form any tree path; and said means for determining an alternate path further including means for examining valid cross-links for use as segments of an alternate path, wherein a valid cross-link is one whose end terminals are connected to bridges of said second group, and one whose end terminals are joined to bridges of said second group wherein a tree path of one of the bridges of said second group connected to one end terminal of a cross-link is not a segment of a tree path of the other bridge of the second group connected to another end terminal said cross-link, and wherein the tree path of the other bridge of the second group is not a segment of the tree path of said one bridge of said second group.

16. The apparatus of claim 1 wherein each bridge of said second group of bridges further includes;

means for storing an end station location (ESL) table associating each end station with bridges in the second group near each end station;

means for storing a bridge address (BA) table associating each bridge of said second group with a medium access control (MAC) address;

means for storing a bridge forwarding (BF) table for indicating a path of the associated bridge that leads to a next hop along a best path found for forwarding a frame; and means responsive to a received frame and information stored in said BA, ESL and BF tables for selecting a path to an end station identified in destination information incorporated as part of said received frame.

17. The apparatus of claim 1 wherein, when a transfer through the intervening bridge is in the downstream direction, said intervening bridge directing the encapsulated frame to said downstream bridge responsive to said destination address in accordance with normal frame forwarding over a tree path; and said down stream bridge including means for stripping the encapsulated portions of an encapsulated frame and for forwarding said stripped encapsulated frame over a remaining portion of the forwarding path to an end station identified by a destination address incorporated as part of the unencapsulated frame; and when said transfer through the intervening bridge is in the upstream direction, said intervening bridge directing the encapsulated frame to said upstream bridge responsive to said destination address in accordance with normal frame forwarding over a tree path; and said upstream bridge including means for stripping the encapsulated portions of an encapsulated frame and for forwarding said stripped encapsulated frame over a remaining portion of the forwarding path to an end station identified by a destination address incorporated as part of the unencapsulated frame.

18. Apparatus for determining a best path for forwarding a frame received at a bridge in a system comprised of a plurality of interconnected local area networks (LANS) each having a plurality of end stations, and a spanning tree incorporating a plurality of bridges of first and second groups for loop-free forwarding a frame from a source end station to a destination end station wherein said source and destination end stations may reside in different LANS, said bridges of said first and second groups having means for determining a tree path for loop-free forwarding of said frame; and said second group of bridges further having means for determining if an alternate path exists for loop-free forwarding of said frame which has at least one non-tree path segment;

means for utilizing said alternate path if it satisfies one of a group of topological criteria including: a shorter physical path; a less costly path; a path having less delay and a smaller number of hops between source and destination means for determining at each second group of bridges, if another bridge of said second group is directly connected thereto by a cross-link which is not a tree path; and means for determining an alternate path further including means for examining valid cross-links for use as segments of an alternate path.

19. The apparatus of claim 18 further comprising:

means for operating said second group of bridges to utilize said tree paths for default frame forwarding, and to utilize said alternate paths, if possible, to forward a predetermined class of frames.

20. A method for determining a path for forwarding a frame in a system having a plurality of end stations and bridges for loop-free forwarding of a frame, said bridges being of first and second groups, said first group having means for transferring a frame from an end station using a spanning tree bridge protocol which provides loop-free frame forwarding and said second group of bridges have cross-links coupling bridges in different tree paths, comprising:

a) operating all of said bridges to establish a loop-free tree path responsive to a frame identifying a source end station and a destination end station;

b) determining presence of an alternate path shorter than the tree path determined in step (a) and employing at least one cross-link (c) determining at each second group of bridges, if another bridge of said second group is directly connected thereto by a cross-link which is not a tree path; and (d) determining an alternate path further including means for examining valid cross-links for use as segments of an alternate path.

21. The method of claim 20 further comprising:

d) employing the path determined in step (b) when it is shorter than the tree path determined in step (a).

22. The method of claim 20 further comprising:

c) employing the path determined in step (a) when it is shorter than the tree path determined in step (b).

23. The method of claim 20 further comprising:

(c) operating said second group of bridges to process path data incorporating cross-links to determine possible paths employing bridges in the system for forwarding frames; and (d) operating said first and second groups of bridges to establish a loop-free frame forwarding path while said second group of bridges are performing step (c).

24. The method of claim 20 wherein step (a) further comprises:

(c) conveying to other bridges of said second group information representing topology known to the conveying bridge;
(d) conveying to other bridges of the second group information identifying bridges of the second group which are a source for frames and a destination for frames;
(e) conveying to other bridges of the second group topology information known to bridges of the second group other than the conveying bridge; and
(f) storing information received from other bridges of said second group for determining an alternate path shorter than a tree path.

25. The method of claim 20 further comprising:

each bridge of said second group:
(c) storing an end station location (ESL) table associating each end station with bridges in the second group near each end station;
(d) storing a bridge address (BA) table associating each bridge of said second group with a medium access control (MAC) address;
(e) storing a bridge forwarding (BF) table for indicating a path of the associated bridge that leads to a next hop along a best path found for forwarding a frame; and
(f) responsive to a received frame and information stored in said BA, ESL and BF tables, selecting a path to an end station identified in destination information incorporated as part of said received frame.

26. The method of claim 20 further comprising:

operating said second group of bridges to utilize said tree paths for default frame forwarding, and utilizing said alternate paths, if possible, to forward a predetermined class of frames.

* * * * *